United States Patent
Oh et al.

(10) Patent No.: US 9,554,197 B2
(45) Date of Patent: *Jan. 24, 2017

(54) APPARATUS AND METHOD FOR PROCESSING AN INTERACTIVE SERVICE

(71) Applicant: LG Electronics Inc., Seoul (KR)

(72) Inventors: Sejin Oh, Seoul (KR); Byungsun Park, Seoul (KR); Kyoungsoo Moon, Seoul (KR); Gomer Thomas, Arlington, WA (US); Seungjoo An, Seoul (KR); Jinwon Lee, Seoul (KR); Jinpil Kim, Seoul (KR); Kyungho Kim, Seoul (KR); Aettie Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,964

(22) Filed: Mar. 10, 2014

(65) Prior Publication Data

US 2014/0325544 A1  Oct. 30, 2014

Related U.S. Application Data

(63) Continuation of application No. 13/926,558, filed on Jun. 25, 2013, now Pat. No. 8,719,856.
(Continued)

(51) Int. Cl.
*H04H 60/32* (2008.01)
*H04N 21/81* (2011.01)
(Continued)

(52) U.S. Cl.
CPC ........ *H04N 21/8133* (2013.01); *H04N 21/235* (2013.01); *H04N 21/2353* (2013.01);
(Continued)

(58) Field of Classification Search
CPC ............... H04N 21/8133; H04N 21/23418; H04N 21/478; H04N 21/2353; H04N 21/4307; H04N 21/8166; H04N 21/8547; H04N 21/235; H04N 21/2407; H04N 21/435; H04N 21/44222; H04N 21/8545; H04N 21/8586; H04N 21/8173; H04N 21/26283
See application file for complete search history.

(56) References Cited

U.S. PATENT DOCUMENTS 6,415,438 B1 * 7/2002 Blackketter et al. ......... 725/136
7,222,155 B1  5/2007 Gebhardt et al.
(Continued)

FOREIGN PATENT DOCUMENTS

JP  2005020090 A  1/2005
JP  200510145 A  4/2005
(Continued)

OTHER PUBLICATIONS

T. Masaru, et al.: "Technologies supporting Hybridcast", NHK R&D, No. 133, 2012, pp. 20-27.
(Continued)

*Primary Examiner* — Oschta Montoya
(74) *Attorney, Agent, or Firm* — Dentons US LLP

(57) ABSTRACT

A method of processing an interactive service and an apparatus includes generating an application parameter table including a first identifier and a second identifier, wherein the first identifier identifies a interactive programming segment which application parameter table pertains to, and wherein the second identifier identifies an application within the scope of application parameter table; generating an activation message file that indicates at least one of activation times of the applications, wherein the activation message file includes a third identifier and activation messages, wherein the third identifier matches the first identifier of
(Continued)

application parameter table which contains the applications, wherein the activation message includes a fourth identifier and a start time information, wherein the fourth identifier matches the second identifier of the application in the application parameter table.

4 Claims, 21 Drawing Sheets

Related U.S. Application Data

(60) Provisional application No. 61/664,150, filed on Jun. 25, 2012, provisional application No. 61/668,442, filed on Jul. 5, 2012, provisional application No. 61/680,279, filed on Aug. 7, 2012, provisional application No. 61/684,120, filed on Aug. 16, 2012, provisional application No. 61/767,260, filed on Feb. 21, 2013.

(51) Int. Cl.
| | | |
|---|---|---|
| *H04N 21/234* | (2011.01) | |
| *H04N 21/478* | (2011.01) | |
| *H04N 21/235* | (2011.01) | |
| *H04N 21/43* | (2011.01) | |
| *H04N 21/8547* | (2011.01) | |
| *H04N 21/24* | (2011.01) | |
| *H04N 21/435* | (2011.01) | |
| *H04N 21/442* | (2011.01) | |
| *H04N 21/8545* | (2011.01) | |
| *H04N 21/858* | (2011.01) | |
| *H04N 21/262* | (2011.01) | |

(52) U.S. Cl.
CPC ... *H04N 21/23418* (2013.01); *H04N 21/2407* (2013.01); *H04N 21/26283* (2013.01); *H04N 21/435* (2013.01); *H04N 21/4307* (2013.01); *H04N 21/44222* (2013.01); *H04N 21/478* (2013.01); *H04N 21/8166* (2013.01); *H04N 21/8173* (2013.01); *H04N 21/8545* (2013.01); *H04N 21/8547* (2013.01); *H04N 21/8586* (2013.01)

(56) References Cited

U.S. PATENT DOCUMENTS

| | | | |
|---|---|---|---|
| 7,275,256 B1* | 9/2007 | Del Beccaro et al. | 725/143 |
| 7,568,214 B2* | 7/2009 | Leak et al. | 725/110 |
| 8,705,933 B2* | 4/2014 | Eyer | H04N 5/76 |
| | | | 386/241 |
| 8,719,856 B2 | 5/2014 | Oh et al. | |
| 9,038,097 B2 | 5/2015 | Oh et al. | |
| 2002/0162118 A1 | 10/2002 | Levy et al. | |
| 2003/0084441 A1 | 5/2003 | Hunt | |
| 2005/0015796 A1* | 1/2005 | Bruckner et al. | 725/32 |
| 2005/0015802 A1 | 1/2005 | Masson | |
| 2006/0271971 A1* | 11/2006 | Drazin | 725/86 |
| 2007/0283402 A1 | 12/2007 | Yu | |
| 2008/0098443 A1 | 4/2008 | Gan et al. | |
| 2009/0276819 A1 | 11/2009 | Kim et al. | |
| 2010/0309387 A1* | 12/2010 | Eyer | H04N 21/235 |
| | | | 348/731 |
| 2011/0072450 A1 | 3/2011 | Kokemak et al. | |
| 2011/0075990 A1 | 3/2011 | Eyer | |
| 2011/0177774 A1 | 7/2011 | Gupta et al. | |
| 2011/0202947 A1 | 8/2011 | Gupta et al. | |
| 2011/0246488 A1 | 10/2011 | Eyer | |
| 2011/0307920 A1 | 12/2011 | Blanchard et al. | |
| 2012/0050619 A1* | 3/2012 | Kitazato | H04N 21/4882 |
| | | | 348/723 |
| 2012/0054235 A1 | 3/2012 | Kitazato et al. | |
| 2012/0054784 A1 | 3/2012 | Kitazato et al. | |
| 2012/0137339 A1 | 5/2012 | Lee et al. | |
| 2012/0159541 A1 | 6/2012 | Carton et al. | |
| 2013/0024894 A1* | 1/2013 | Eyer | H04N 21/433 |
| | | | 725/40 |
| 2013/0024897 A1* | 1/2013 | Eyer | H04N 21/433 |
| | | | 725/50 |
| 2013/0205323 A1* | 8/2013 | Sinha et al. | 725/19 |
| 2013/0283311 A1* | 10/2013 | Eyer | H04N 21/8133 |
| | | | 725/32 |
| 2014/0040965 A1 | 2/2014 | Kitazato et al. | |

FOREIGN PATENT DOCUMENTS

| | | |
|---|---|---|
| JP | 2010-166335 A | 7/2010 |
| JP | 2012-070351 A | 4/2012 |
| JP | 2012070351 A | 4/2012 |
| KR | 1020120021200 A | 8/2012 |
| WO | 2011-066171 A2 | 6/2011 |
| WO | 2011066171 A2 | 6/2011 |
| WO | 2012/029565 A1 | 3/2012 |
| WO | 2012/039316 A1 | 3/2012 |
| WO | 2012-070903 A2 | 5/2012 |
| WO | 2012070903 A2 | 5/2012 |

OTHER PUBLICATIONS

T. Masaru et al., "Technologies supporting Hybridcast", NHK R&D, No. 133, 2012, pp. 20-27.

Office Action of the U.S Patent Office in U.S. Appl. No 14/689,432, dated Aug. 8, 2016.

* cited by examiner

FIG. 1

| Segment of Show A | Ad 1 | Ad 2 | Segment of Show B | Ad 3 | Ad 4 | Segment of Show B | Ad 5 |
|---|---|---|---|---|---|---|---|
| | | | | | | | |

FIG. 4

```
Trigger      = locator_part [ "?" terms ]

locator_part = hostname "." path_segments hostname     = *( domainlabel "." ) toplabel
domainlabel  = alphanum | alphanum *( alphanum | "-" ) alphanum
toplabel     = alpha | alpha *( alphanum | "-" ) alphanum path_segments = segment *( "/" segment )
segment       = 1*alphanum terms       = ( event_time | media_time ) [ "&" spread ] [ "&" others ]
event_time  = "e=" 1*digit [ "&t=" 1*7hexdigit ]
media_time  = "m=" 1*7hexdigit
others      = other [ "&" other ]
other       = resv_cmd "=" 1*alphanum
spread      = "s=" 1*digit
resv_cmd    = <any alphanum except "c", "e", "E", "m", "M", "s", "S", "t", or "T"> alphanum    = alpha | digit
alpha       = lowalpha | upalpha lowalpha = "a" | "b" | "c" | "d" | "e" | "f" | "g" | "h" | "i" |
           "j" | "k" | "l" | "m" | "n" | "o" | "p" | "q" | "r" |
           "s" | "t" | "u" | "v" | "w" | "x" | "y" | "z"
upalpha  = "A" | "B" | "C" | "D" | "E" | "F" | "G" | "H" | "I" |
           "J" | "K" | "L" | "M" | "N" | "O" | "P" | "Q" | "R" |
           "S" | "T" | "U" | "V" | "W" | "X" | "Y" | "Z"
digit    = "0" | "1" | "2" | "3" | "4" | "5" | "6" | "7" |
           "8" | "9"
hexdigit = "0" | "1" | "2" | "3" | "4" | "5" | "6" | "7" |
           "8" | "9" | "a" | "b" | "c" | "d" | "e" | "f"
```

FIG. 5

Table 8.1 TDO Parameters Table Structure

| Element/Attribute (with @) | No. allowed | Data Type | Description & Value |
|---|---|---|---|
| TPT | | | |
|   @majorProtocolVersion | 1 | Integer, range 0..15 | Major Protocol Version |
|   @minorProtocolVersion | 0..1 | integer, range 0..15 | Minor Protocol version |
|   @id | 1 | anyURL | segment_id = domain_name/program_id |
|   @tptVersion | 1 | unsignedByte | Data version of this TPT |
|   @expireDate | 0..1 | dateTime | Date after which this TPT will not be used |
|   @updatingTime | 0..1 | unsignedShort | Time interval to check for TPT updates |
|   @serviceID | 0..1 | unsignedShort | NRT service_id |
|   @baseURL | 0..1 | anyURL | Base URL for all relative URLs in TPT |
|   Capabilities | 0..1 | nrt:CapabilitiesType | Essential capabilities for the segment associated with this TPT |
|   LiveTrigger | 0..1 | | Info on Internet live trigger delivery |
|     @URL | 1 | anyURL | URL of server for live triggers |
|     @pollPeriod | 0..1 | unsignedByte | Short polling period in seconds |
|   TDO | 1..N | | TDO (app) for the segment associated with this TPT |
|     @appID | 1 | unsignedShort | Application ID of this app, unique within the scope of this TPT |
|     @appType | 0..1 | integer, range 0-15 | Application type (default: 1 ="TDO") |
|     @appName | 0..1 | string | Display name (for viewer launch consent) |
|     @globalID | 0..1 | anyURL | Globally unique app ID |
|     @appVersion | 0..1 | unsignedByte | Version of this app |
|     @cookieSpace | 0..1 | unsignedByte | Persistent storage needed; default=0 |
|     @frequencyOfUse | 0..1 | integer, range 0..15 | code values per Table 8.2 |
|     @expireDate | 0..1 | dateTime | Expire date for caching this app |

FIG. 6

| | | | | | |
|---|---|---|---|---|---|
| | @testTDO | | 0..1 | boolean | Flag for test app; default="false" |
| | @availInternet | | 0..1 | boolean | Default="true" |
| | @availBroadcast | | 0..1 | boolean | Default="true" |
| | URL | | 1..N | anyURL | App URL(s) |
| | | @entry | 0..1 | boolean | Indicator of entry point; default = "false" |
| | Capabilities | | 0..1 | nrt:CapabilitiesType | Essential capabilities to present this app |
| | ContentItem | | 0..N | | Content item used by this app |
| | | URL | 1..N | anyURL | URL(s) of content item |
| | | @entry | 0..1 | boolean | Indicator of entry point ; default = "false" |
| | | @updatesAvail | 0..1 | boolean | Default="false" |
| | | @pollPeriod | 0..1 | unsignedByte | Short polling period in seconds |
| | | @size | 0..1 | 24-bit integer | Size of content item, in kilobytes |
| | | @availInternet | 0..1 | boolean | Default="true" |
| | | @availBroadcast | 0..1 | boolean | Default "true" |
| | Event | | 1..N | | Event targeted to this TDO |
| | | @eventID | 1 | unsignedShort | Unique identifier of this Event element within the scope of the TDO element. |
| | | @action | 1 | string | Allowed values are "prep", "exec", "susp", and "kill" |
| | | @destination | 0..1 | unsignedByte | Device to which the event is directed (primary screen, second screen or both) |
| | | @diffusion | 0..1 | unsignedByte | Period for applying diffusion, in seconds |
| | | Data | 0..N | base64Binary | Data to be used for this event |
| | | @dataID | 1 | unsignedShort | Unique identifier of this Data element within the scope of the Event element. |

FIG. 7

Table 8.2 Meaning of Frequency of Use attribute values

| "frequencyOfUse" value | Meaning |
|---|---|
| 0 | One - time use only |
| 1 | Hourly |
| 2 | Daily |
| 3 | Weekly |
| 4 | Monthly |
| 5-15 | Reserved |

FIG. 8

Table 8.3 Meaning of "destination" attribute values

| "destination" value | Meaning |
|---|---|
| 0 | reserved |
| 1 | primary device only |
| 2 | one or more secondary devices only |
| 3 | Primary device and/or one or more secondary devices |

FIG. 9

| Syntax | No. Bits | Format |
|---|---|---|
| binary_tdo_parameters_table { | | |
|     reserved | 2 | '11' |
|     expire_date_included | 1 | bslbf |
|     segment id length | 5 | uimsbf |
|     segment_id | var | bslbf |
|     base_URL_length | 8 | uimsbf |
|     base_URL | var | bslbf |
|     If (expire_date_included=='1') { | | |
|         expire_date | 32 | usmsbf |
|     } | | |
|     trigger_server_URL_length | 8 | uimsbf |
|     trigger_server_URL | var | bslbf |
|     If (trigger_server_URL_length != 0) { | | |
|         reserved | 7 | '1111' |
|         trigger_delivery_type | 1 | uimsbf |
|         if (trigger_delivery_type == 0) { | | |
|             poll_period | 8 | uimsbf |
|         } | | |
|     } | | |
|     num_apps_in_table | 8 | uimsbf |
|     for (k=0; k< num_apps in_table; k++) { | | |
|         app_id | 16 | uimsbf |
|         app_type_included | 1 | bslbf |
|         app_name_included | 1 | bslbf |

FIG. 10

| | | |
|---|---|---|
| global id included | 1 | bslbf |
| app_version_included | 1 | bslbf |
| cookie_space_included | 1 | bslbf |
| frequency_of_use_included | 1 | bslbf |
| expire_date_included | 1 | bslbf |
| reserved | 1 | '1' |
| If (app_type_included=='1') { | | |
|     app_type | 8 | uimsbf |
| } | | |
| If (app_name_included=='1') { | | |
|     app_name_length | 8 | uimsbf |
|     app_name | Var | bslbf |
| } | | |
| If (global_id_included=='1') { | | |
|     global_id_length | 8 | uimsbf |
|     global_id | Var | bslbf |
| } | | |
| If (app_version_included=='1') { | | |
|     app_version | 8 | uimsbf |
| } | | |
| If (cookie_space_included=='1') { | | |
|     cookie_space | 8 | uimsbf |
| } | | |
| if (frequency_of_use_included) { | | |
|     frequency_of_use | 8 | uimsbf |

FIG. 11

| | | |
|---|---|---|
| }  | | |
| if (expire_date_included) { | | |
|    expire_date | 32 | uimsbf |
| } | | |
| test_app | 1 | bslbf |
|    available_on_internet | 1 | bslbf |
|    available_in_broadcast | 1 | bslbf |
| reserved | 1 | '1' |
| number_URLs | 4 | |
| for (j=0; j<number_URLs; j++) { | | |
|    URL_length | 8 | uimsbf |
|    URL | var | |
| } | | |
| number_content_items | 8 | uimsbf |
| for (j=0; j<number_content_items;j++) { | | |
|    updates_avail | 1 | bslbf |
|    avail_internet | 1 | bslbf |
|    avail_broadcast | 1 | bslbf |
|    content_size_included | 1 | bslbf |
|    number_URLs | 4 | uimsbf |
|    for (i=0; i<number_URLs; i++) { | | |
|      URL_length | 8 | uimsbf |
|      URL | var | bslbf |
|    } | | |
|    if (content_size_included) { | | |

FIG. 12

| | | |
|---|---|---|
|     content size | 24 | uimsbf |
| } | | |
| num_content_descriptors | 8 | uimsbf |
| for (i=0; i<num_content_descriptors; i++) { | | |
|     content_descriptor() | var | bslbf |
| } | | |
| } | | |
| number_events | 16 | uimsbf |
| for (i=0; i<num_events; i++) { | | |
|     event_id | 16 | uimsbf |
|     action | 5 | uimsbf |
|     destination_included | 1 | bslbf |
|     diffusion_included | 1 | bslbf |
|     data_included | 1 | bslbf |
|     If (destination_included == ?? { | | |
|         destination | 8 | |
|     } | | |
|     If (diffusion_included == ?? { | | |
|         diffusion | | |
|     } | | |
|     If (data_included = ?? { | | |
|         data_size | 8 | |
|         data bytes | var | bslbf |
|     } | 8 | uimsbf |
| } | | |

FIG. 13

| | | |
|---|---|---|
| num_app_descriptors | 8 | uimsbf |
| for (i=0; i<num_app_descriptors; i++) { | | |
|     app_descriptor() | var | bslbf |
| } | | |
| } | | |
| num_TPT_descriptors | 8 | uimsbf |
| for (i=0; i<num_TPT_descriptors; i++) { | | |
|     TPT_descriptor() | var | bslbf |
| } | | |
| } | | |

FIG. 14

Table 8.4 Activation Messages Table Structure

| Element/Attribute (with @) | | | No. allowed | Data Type | Description & Value |
|---|---|---|---|---|---|
| AMT | | | | | |
| | @majorProtocolVersion | | 1 | integer 0-15 | Major protocol version |
| | @minorProtocolVersion | | 0..1 | Integer 0-15 | Minor protocol version |
| | @segmentId | | 1 | anyURL | domain_name/program_id = segment id |
| | @beginMT | | 0..1 | unsignedInt | Start time of this segment time scope |
| | Activation | | 1..N | | Activation message |
| | | @targetTDO | 1 | unsignedShort | appID of target TDO |
| | | @targetEvent | 1 | unsignedShort | eventID of target Event in target TDO |
| | | @targetData | 0..1 | unsignedShort | dataID of target Data in target Event |
| | | @startTime | 1 | unsignedInt | Start time of action period |
| | | @endTime | 0..1 | unsignedInt | End time of action period |

FIG. 15

Table 8.5 URL List Structural Diagram

| Element Attribute (with @) | No. allowed | Data Type | Description & Value |
|---|---|---|---|
| UrlList | | | List of potentially useful URLs |
|     TptUrl | 0..N | anyURL | URL of TPT for future segment |
|     NrtSignalingUrl | 0..1 | anyURL | URL of NRT Signaling Server |
|     UrsUrl | 0..1 | anyURL | URL of Usage Reporting Server |
|     PdiUrl | 0..1 | anyURL | URL of PDI-Q table |

FIG. 16

| Syntax | No. Bits | Format |
|---|---|---|
| tpt_section () { | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocolversion | 8 | uimsbf |
|         sequence_number | 8 | uimsbf |
|     } | | |
|     reserved | 2 | '11' |
|     TPT_data_version | 5 | uimsbf |
|     current_next_indicator | 1 | '1' |
|     section_number | 8 | uimsbf |
|     last_section_number | 8 | uimsbf |
|     service_id | 16 | uimsbf |
|     tpt_bytes() | var | bslbf |
| } | | |

FIG. 17

```xml
<?xml version="1.0" encoding="UTF-8"?>
<xs:schema xmlns:xs="http://www.w3.org/2001/XMLSchema">
  <xs:element name="UrlList">
    <xs:complexType>
      <xs:sequence>
        <xs:element name="TptUrl" type="xs:anyURI" minOccurs="0" maxOccurs="unbounded"/>
        <xs:element name="NrtSignalingUrl" type="xs:anyURI" minOccurs="0"/>
      </xs:sequence>
    </xs:complexType>
  </xs:element>
</xs:schema>
```

FIG. 18

| Void addTriggerEventListener(Number eventID, EventListener listener) | | |
|---|---|---|
| Description | Add a listener for the Event designated by eventId within the scope of the currently executing TDO in the TPT. When this Event is activated by an Activation Trigger, the listener shall be called, and an object of type TriggerEvent type shall be passed to it. | |
| Arguments | eventID | The eventId of the Event element in the TPT |
| | listener | The listener for the event |

FIG. 19

| Void addTriggerEventListener(Number eventId, EventListener listener) | | |
|---|---|---|
| Description | Remove the designated listener for the Event designated by eventId. | |
| Arguments | eventId | The eventId of the Event element in the TPT |
| | listener | The listener for the event |

FIG. 20

Interface EventListener {
    handleEvent(in TriggerEvent event);
};

FIG. 21

| Interface TriggerEvent : Event {<br>readonly attribute String eventId;<br>readonly attribute String data;<br>readonly attribute DOMString status;<br>} | | |
|---|---|---|
| Properties | eventId | The eventId of the Event element in the TPT |
| | data | The data for this activation of the event, in hexadecimal |
| | status | Status of the event, equal to "trigger" when the Event is activated in response to an Activation Trigger, or "error" when some kind of error occurred. |

FIG. 22

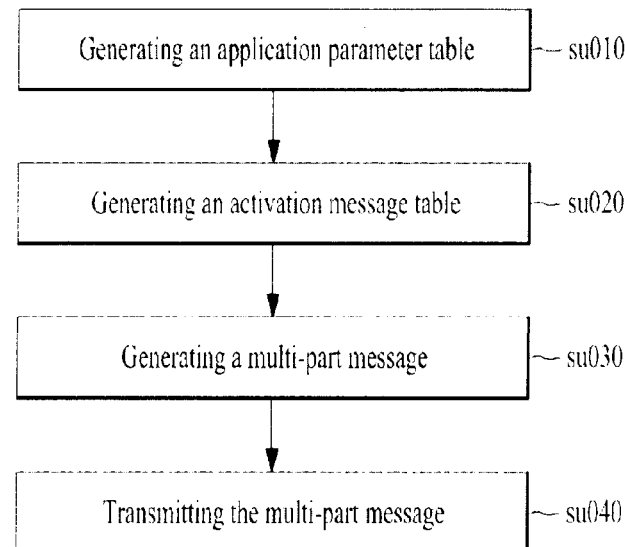

APPARATUS AND METHOD FOR PROCESSING AN INTERACTIVE SERVICE

This application is a continuation of prior application Ser. No. 13/926,558, filed Jun. 25, 2013, which claims the benefit of U.S. Provisional Patent Applications No. 61/664,150, filed on Jun. 25, 2012, 61/668,442, filed on Jul. 5, 2012, 61/680,279, filed on Aug. 7, 2012, 61/684,120, filed on Aug. 16, 2012 and 61/767,260, filed on Feb. 21, 2013, which is hereby incorporated by reference as if fully set forth herein.

BACKGROUND OF THE INVENTION

Field of the Invention

The present invention relates to a method and apparatus for providing, receiving and processing a broadcast service, and more particularly, to a method and apparatus for providing a supplementary service related to broadcast content.

Discussion of the Related Art

TVs first appeared at the end of the $19^{th}$ century and have become the most popular information delivery apparatus since the end of the $20^{th}$ century as a screen display method or design thereof has been continuously developed. However, TVs generally enable viewers to receive unidirectional information from a broadcast station. Such TV limitations have become problematic as personal computers (PCs) and the Internet have come into widespread use since the 1990s. Therefore, TVs have been developed to be able to provide an interactive service.

However, currently, there is no system for providing an interactive service between a content provider and a viewer. In particular, in order to provide such an interactive service, there is a need for a method of executing an application related to broadcast content, which is currently being broadcast, at a specific time and providing related information to a viewer through special information processing.

SUMMARY OF THE INVENTION

Accordingly, the present invention is directed to an apparatus and method for processing an interactive service that substantially obviates one or more problems due to limitations and disadvantages of the related art.

An object of the present invention is to provide supplementary information related to broadcast content at an appropriate time during a period when the broadcast content is played back.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing an interactive service according to the present invention includes generating an application parameter table which includes information about at least one of applications, wherein the application parameter table includes a first identifier and a second identifier, wherein the first identifier identifies a interactive programming segment which application parameter table pertains to, and wherein the second identifier identifies an application within the scope of application parameter table, generating an activation message file that indicates at least one of activation times of the applications, wherein the activation time means a time of an activation, wherein the activation message file includes a third identifier and activation messages, wherein the third identifier matches the first identifier of application parameter table which contains the applications to which the activation messages in the activation message file apply, wherein the activation message includes a fourth identifier and a start time information, wherein the fourth identifier matches the second identifier of the application in the application parameter table with which the activation message file is associated, and wherein the start time information indicates the start of time period for an event targeted to the application relative to time of the segment generating a multi-part message with the application parameter table as the first part of the multi-part message and the activation message file as the second part of the multi-part message and transmitting the multi-part message to receiver via HTTP.

Preferably, the application parameter table further includes a fifth identifier, the fifth identifier identifies the event, and the activation message further includes a sixth identifier, and the sixth identifier matches the fifth identifier of the application identified by the fourth identifier.

Preferably, the activation occurs immediately, when the activation message file is received after the start of time period for the event.

Preferably, the application parameter table further includes version information that indicates a version number of a definition of the application parameter table.

Preferably, the application parameter table further includes a seventh identifier, the seventh identifier identifies data to be used for the event identified by the fifth identifier, and the activation message further includes a eighth identifier, the eighth identifier matches the seventh identifier of the application identified by the fourth identifier.

Preferably, the activation message further includes end time information, and the end time information indicates the end of time period for the event, relative to the time of the segment.

Preferably, the application is a Triggered Declarative Object (TDO), and the application parameter table is a TDO parameter table.

Preferably, the time of the segment is media time of the segment, and the media time of the segment is a parameter referencing a point in a playout of a content item.

In another aspect of the present invention, an apparatus for receiving an interactive service according to the present invention includes a network interface configured to receive a multi-part message via HTTP, wherein the multi-part message is consist of an application parameter table as the first part of the multi-part message and an activation message file as the second part of the multi-part message, a trigger module configured to parse the multi-part message, obtain the application parameter table and the activation message file, parse the application parameter table which includes information about at least one of applications, obtain a first identifier, a second identifier and an URL information, wherein the first identifier identifies a interactive programming segment which the application parameter table pertains to, wherein the second identifier identifies the application within the scope of the application parameter table, wherein the URL information indicates the URL of a server that can deliver the application, wherein the URL information identifies a file which is part of the application, and wherein the network interface downloads the application using the URL information, parse the activation message file that indicates at least one of activation times of the applications, wherein the activation time means a time of an activation, obtain a third identifier and activation messages, wherein the third identifier matches the first identifier of the application parameter table which contains the applications to which the activation messages in the activation message file apply, parse the activation message, and obtain a fourth identifier and a start time information, wherein the fourth identifier matches the second identifier of the application in the application parameter table with which the activation message file is associated, and wherein the start time information indicates the start of time period for an event targeted to the application, relative to time of the segment, a network interface configured to download the application using the URL information and a display module configured to display the application.

Preferably, the application parameter table further includes a fifth identifier, the trigger module configured to parse the application parameter table, obtain also the fifth identifier, the fifth identifier identifies the event, and the activation message further includes a sixth identifier, the trigger module configured to parse the activation message, obtain also the sixth identifier, and the sixth identifier matches the fifth identifier of the application identified by the fourth identifier.

Preferably, the activation occurs immediately, when the activation message file is received after the start of time period for the event.

Preferably, the application parameter table further includes version information that indicates a version number of a definition of the application parameter table.

Preferably, the application parameter table further includes a seventh identifier, the trigger module configured to parse the application parameter table, obtain also the seventh identifier, the seventh identifier identifies data to be used for the event identified by the fifth identifier, and the activation message further includes a eighth identifier, the trigger module configured to parse the activation message, obtain also the eighth identifier, and the eighth identifier matches the seventh identifier of the application identified by the fourth identifier.

Preferably, the activation message further includes end time information, the trigger module configured to parse the activation message, obtain also the end time information, and the end time information indicates the end of time period for the event, relative to the time of the segment.

Preferably, the application is a Triggered Declarative Object (TDO), and the application parameter table is a TDO parameter table.

Preferably, the time of the segment is media time of the segment, and the media time of the segment is a parameter referencing a point in a playout of a content item.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram showing an embodiment of a typical broadcast stream;

FIG. 4 is a diagram showing an embodiment of trigger syntax;

FIG. 5 is a diagram showing an embodiment of a TDO parameter table;

FIG. 6 is a diagram showing an embodiment of a TDO parameter table;

FIG. 7 is a diagram showing the meaning of "Frequency of Use" attribute values;

FIG. 8 is a diagram showing the meaning of "destination" attribute values;

FIG. 9 is a diagram showing an embodiment of the syntax of binary form of a TDO Parameters Table;

FIG. 10 is a diagram showing an embodiment of the syntax of the binary form of a TDO Parameters Table;

FIG. 11 is a diagram showing an embodiment of the syntax of the binary form of a TDO Parameters Table;

FIG. 12 is a diagram showing an embodiment of the syntax of the binary form of a TDO Parameters Table;

FIG. 13 is a diagram showing an embodiment of the syntax of the binary form of a TDO Parameters Table;

FIG. 14 is a diagram showing an embodiment of an activation message table structure;

FIG. 15 is a diagram showing an embodiment of a URL List structural diagram;

FIG. 16 is a diagram showing an embodiment of the binary format for the private sections containing TPTs;

FIG. 17 is a diagram showing an embodiment of a list of URLs encoded as an XML document;

FIG. 18 is a diagram showing an embodiment of addTriggerEventListener;

FIG. 19 is a diagram showing an embodiment of removeTriggerEventListener;

FIG. 20 is a diagram showing an embodiment of the definition of the EventListener type;

FIG. 21 is a diagram showing an embodiment of the definition of the TriggerEvent type;

FIG. 22 is a diagram showing an embodiment of a transmission method in a TDO model;

DETAILED DESCRIPTION OF THE INVENTION

Figure 2:
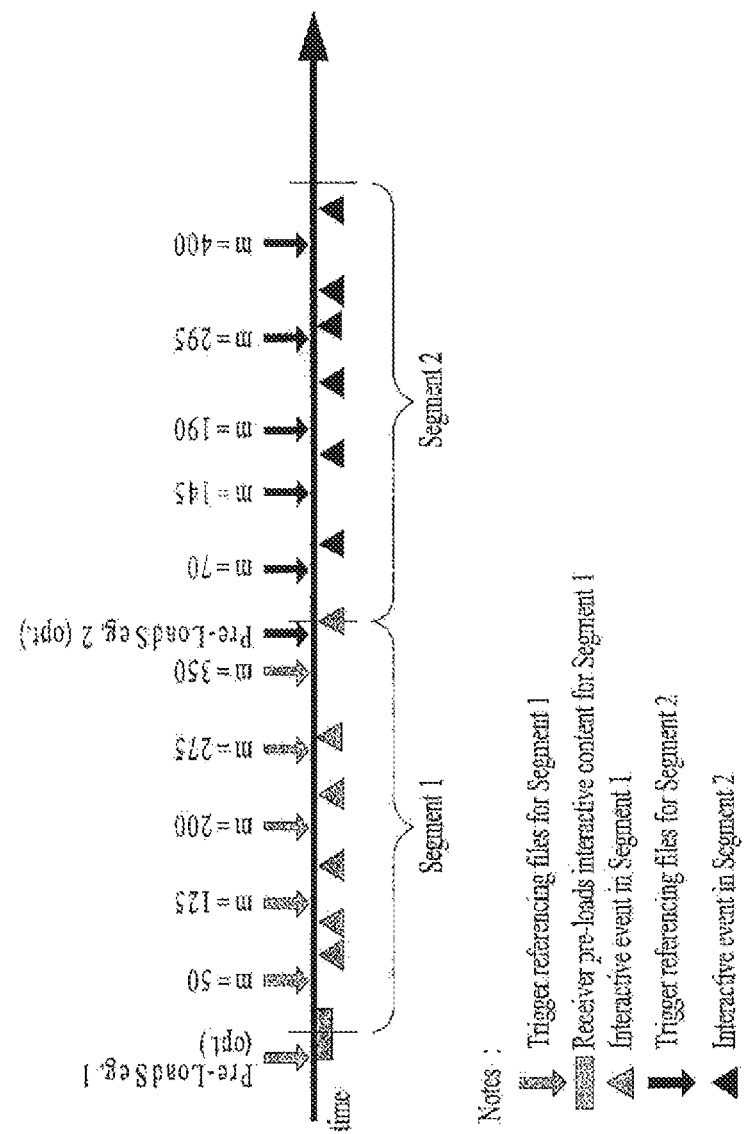
FIG. 2 is a diagram showing an embodiment of trigger timing in case of pre-produced content.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

In the present specification, the term media time stands for a parameter referencing a point in the playout of an audio/video or audio content item. ACR stands for Automatic Content Recognition. AMT stands for Activation Messages Table. API stands for Application Programming Interface. DAE stands for Declarative Application Environment. DO stands for Declarative Object. FLUTE stands for File Delivery over Unidirectional Transport. GPS stands for Global Positioning System. HTTP stands for Hypertext Transfer Protocol. IP stands for Internet Protocol. IPTV stands for Internet Protocol Television. iTV stands for Interactive Television. MIME stands for Internet Media Type. NDO stands for NRT Declarative Object. NRT stands for Non-Real Time. SMT stands for Service Map Table. SSC stands for Service Signaling Channel. TDO stands for Triggered Declarative Object. TPT stands for TDO Parameters Table. UDO stands for Unbound Declarative Object. UPnP stands for User Plug and Play. URI stands for Uniform Resource Identifier. URL stands for Uniform Resource Locator. XML stands for eXtensible Markup Language. Details thereof will be described below.

In this specification, a time base message includes a time base trigger and an equivalent thereof. Accordingly, the term "time base message" may be used interchangeably with the term "time base trigger".

In this specification, an activation message includes all information delivery causing activation, such as an activation element in an AMT and/or an activation trigger.

In this specification, DO, TDO, NDO and UDO have the following meanings.

DO (Declarative Object) can be a collection constituting an interactive application. (For example, HTML, JavaScript, CSS, XML and multimedia files)

The term "Triggered Declarative Object" (TDO) is used to designate a Declarative Object that has been launched by a Trigger in a Triggered interactive adjunct data service, or a DO that has been launched by a DO that has been launched by a Trigger, and so on iteratively.

The term "NRT Declarative Object" (NDO) is used to designate a Declarative Object that has been launched as part of an NRT service that is not a Triggered interactive data service.

The term "Unbound Declarative Object" (UDO) is used to designate a Declarative Object that is not bound to a service, such as a Packaged App or a DO launched by a Link, or a DO that has been launched by such a DO, and so on iteratively.

The "Link" is a broadcaster-provided URL that points to a web site which provides on-line information or functionality related to the current TV programming or NRT service.

The "Packaged App" is a broadcaster-provided Declarative Object (DO) that provides information or functionality which the broadcaster wants to offer viewers, and that is packaged up into a single file for viewers to download and install.

A typical broadcast stream consists of a sequence of TV programs. Each TV program consists of an underlying show, which is typically broken up into blocks separated by ads and/or other interstitial material.

FIG. 1 is a diagram showing an embodiment of a typical broadcast stream.

In FIG. 1, Segment of Show A, Ad1, Ad2, Segment of Show B, etc. are sequentially included in the broadcast stream. Segments configuring each show may be referred to as show content and Ads may be referred to as interstitial content.

Each show or piece of interstitial material might or might not have an interactive adjunct data service associated with it.

The term "interactive service segment," or just "segment," will be used in this specification to refer to a portion of an interactive adjunct service that is treated by the broadcaster as an integrated unit. An interactive service segment is typically, but not necessarily, associated with a single show or a single piece of interstitial material.

In order to execute such an interactive adjunct data service, there are two models: Direct execution model and triggered declarative object (TDO) model.

In the direct execution model, a declarative object (DO) can be launched automatically as soon as the virtual channel is selected. It can communicate over the Internet with a backend server to get detailed instructions for providing interactive features—creating displays in specific locations on the screen, conducting polls, launching other specialized DOs, etc., all synchronized with the audio-video program.

In the TDO model, signals can be delivered in the broadcast stream or via the Internet in order to initiate TDO events, such as launching a TDO, terminating a TDO, or prompting some task by a TDO. These events can be initiated at specific times, typically synchronized with the audio-video program. When a TDO is launched, it can provide the interactive features it is programmed to provide.

A basic concept behind the TDO model is that the files that make up a TDO, and the data files to be used by a TDO to take some action, all need some amount of time to be delivered to a receiver, given their size. While the user experience of the interactive elements can be authored prior to the broadcast of the content, certain behaviors must be carefully timed to coincide with events in the program itself, for example the occurrence of a commercial advertising segment.

The TDO model separates the delivery of declarative objects and associated data, scripts, text and graphics from the signaling of the specific timing of the playout of interactive events.

The element that establishes the timing of interactive events is the Trigger.

The information about the TDOs used in a segment and the associated TDO events that are initiated by Triggers is provided by a data structure called the "TDO Parameters Table" (TPT).

The structure of the present specification will be briefly described. First, a trigger and a TPT will be first described and then an AMT in the case in which a bulk of activation triggers is delivered via the Internet will be described.

The structure of the URL List will be described. A URL List can contain certain URLs of potential use to a receiver. URLs for TPTs for one or more future segments, URL of an NRT Signaling Server, URL of a Usage Reporting Server, etc.

Thereafter, the broadcast stream of triggers, TPTs, and the AMT and URL List, which may be delivered along with TPTs and delivery mechanisms via the Internet will be described and then ATSC JavaScript APIs will be described Next, a transmission method and a reception apparatus based on TDO model according to the present invention will be described.

After describing the direct execution model, a transmission method and a reception apparatus based on the direct execution model according to the present invention will be described.

Hereinafter, the trigger will be described.

The trigger is a signaling element whose function is to identify signaling and establish timing of playout of interactive events.

The trigger includes a time base trigger which serves to indicate a media time of a segment related to an interactive service and an activation trigger which serves to indicate an event occurrence time of an application related to an interactive service.

Triggers can perform various timing-related signaling functions in support of interactive services. Triggers can be multi-functional; depending on their structure, a particular Trigger instance can perform one or more of the following functions:

1. Signal the location of a TPT (accessible via a FLUTE session in the emission stream, via an Internet server, or both);
2. Indicate that interactive content for an upcoming program segment is available to be pre-loaded;
3. Indicate the current Media Time of associated audio/video or audio-only content;
4. Reference a particular interactive event in a TPT and signal that the event is to be executed now or at a specified future Media Time;
5. Indicate that accesses to an Internet server are to be spread out randomly over a specified time interval in order to avoid a peak in demand.

Hereinafter, trigger operation will be described, by way of example.

FIG. 2 is a diagram showing an embodiment of trigger timing in case of pre-produced content.

FIG. 2 illustrates Triggers delivered in association with two programming segments. In this example, both segments are "pre-produced," meaning that the content is not from a live broadcast; interactive elements have been added in post-production.

As shown, a short time prior to the occurrence of programming segment 1, a "pre-load" Trigger can be delivered to allow receivers an opportunity to acquire the TPT and interactive content associated with programming segment 1. If a pre-load Trigger is not transmitted, receivers can be expected to use the first Trigger they see within the segment to acquire the content.

Triggers can be sent throughout segment 1, as shown, to indicate the current Media Time (labeled "m" in the figure) relative to the segment. Periodic delivery of Media Time Triggers can be necessary to allow receivers who are just encountering the channel to synchronize and acquire the interactive content.

Just prior to the beginning of segment 2, a pre-load Trigger for that upcoming segment is sent.

In the case of pre-produced content (non-live), the TPT that the receiver can acquire after processing the first Trigger can define the timing of all elements of the interactive experience for that segment. All that is needed for the receiver and TDO to play out the interactive elements can be the knowledge of the media timing; the TPT can describe interactive events relative to Media Time.

Figure 3:
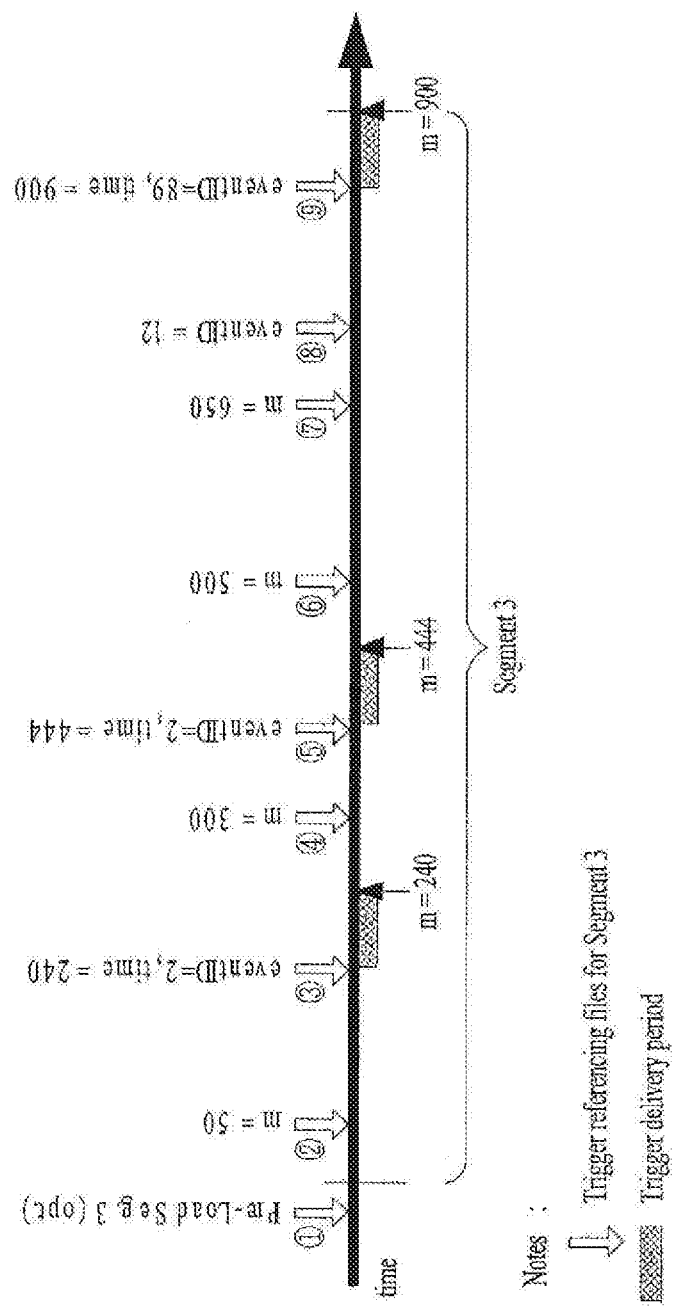
FIG. 3 is a diagram showing an embodiment of trigger timing in case of live content.

FIG. 3 is a diagram showing an embodiment of trigger timing in case of live content.

For the case of live content, the TPT still contains data and information pertinent to different interactive events, however the timing of playout of those events cannot be known until the action in the program unfolds during the broadcast. For the live case, the "event-timing" function of the Trigger is utilized. In this mode, the Trigger can signal that a specified interactive event is to be re-timed to a specified new value of Media Time. Alternatively, the Trigger can indicate that a certain event is to be executed immediately.

In FIG. 3, the functions of triggers of segment 3 will now be described.

A first trigger is a pre-load trigger, which refers to a directory capable of files of segment 3.

A second trigger is a media time trigger which is used to indicate the playout timing of segment 3.

A third trigger is an event re-timing trigger and indicates that the event with eventID=2 in the TPT is to be re-timed to occur at Media Time 240. The hatched area indicates the time interval prior to 240 over which Trigger #3 may be delivered to receivers.

A fourth trigger is a media time trigger.

A fifth trigger is an event re-timing trigger and indicates that the event with eventID=5 in the TPT is to be re-timed to occur at Media Time 444.

A sixth and seventh triggers are media time triggers.

An eighth trigger is an event Trigger and indicates that the event with eventID=12 in the TPT is to be executed immediately.

A ninth trigger is an event re-timing Trigger and indicates that the event with eventID=89 in the TPT is to be re-timed to occur at Media Time 900.

Hereinafter, trigger syntax will be described.

Both Activation messages and Time Base messages can have the following general "Trigger" format under certain delivery circumstances The syntactic definition here is described using the Augmented Backus-Naur Form (ABNF) grammar, except that the vertical bar symbol "|" is used to designate alternatives. Rules are separated from definitions by an equal "=", indentation is used to continue a rule definition over more than one line, literals are quoted with " ", parentheses "(" and ")" are used to group elements, optional elements are enclosed in "[" and "]" brackets, and elements may be preceded with <n>* to designate n or more repetitions of the following element; n defaults to 0. And elements may be preceded with <n>*<m> designate n or more repetitions and m or less repetitions of the following element.

This Trigger syntax is based on the Uniform Resource Identifier (URI): Generic Syntax, excluding the <scheme> and "://" portion, with additional restrictions.

FIG. 4 is a diagram showing an embodiment of trigger syntax.

Hereinafter, FIG. 4 will be described.

The trigger may include locator_part and terms. Terms may be omitted. If terms are present, locator_part and terms may be connected by '?'.

The locator_part may include a hostname part and a path_segments part, which may be connected by '/'.

The hostname may include domainlabel and toplabel, and domainlabel may be repeated 0 times or more along with '.'. That is, hostname may include repeated domainlabel connected with toplabel or include only toplabel.

domainlabel may include one alphanum or include alphanum or "-" repeatedly inserted between alphanum and alphanum 0 times or more.

Here, alphanum may mean alpha or digit.

Here, alpha may be one of lowalpha or upalpha.

Here, lowalpha may be one of a, b, c, d, e, f, g, h, i, j, k, l, m, n, o, p, q, r, s, t, u, v, w, x, y, and z.

Here, upalpha may be one of A, B, C, D, E, F, G, H, I, J, K, L, M, N, 0, P, Q, R, S, T, U, V, W, X, Y, and Z.

Here, digit may be one of 0, 1, 2, 3, 4, 5, 6, 7, 8, and 9.

toplabel includes one alpha or include alphanum or "-" repeatedly inserted between alpha and alphanum 0 times or more.

path_segments includes one segment, which is followed by segment repeated 0 times or more. At this time, segments may be connected by '/'.

Here, segment includes alphanum which is repeated once or more.

Terms may include one of event_time or media_time, which may be followed by spread or others. Spread and others may be omitted. If spread and others are present, '&' may be placed ahead of spread and others and spread and others may be placed after event_time or media_time.

Here, spread may include digit repeated once or more after 's='.

Event_time may include digit repeated once or more after 'e=' or include hexdigit repeated once or more or seven times or less after '&t='. '&t=' and the back part thereof may be omitted.

Here, hexdigit may be one of 0, 1, 2, 3, 4, 5, 6, 7, 8, 9, a, b, c, d, e and f.

Media_time may include hexdigit repeated once or more or less than seven times after 'm='.

Others may include one "other" or "other" followed by '&' and "other".

Here, other may include resv_cmd and alphanum which are repeated once or more and are connected by '='.

Here, resv_cmd may be alphanum excluding 'c', 'e', 'E', 'm', 'M', 's', 'S', 't', and 'T'.

The length of the trigger may not exceed 52 bytes. In addition, the hostname portion of the Trigger can be a registered Internet domain name.

A Trigger can be considered to consist of three parts.

<domain name part>/<directory path>[?<parameters>]

The <domain name part> can be a registered domain name, <directory path> can be a path as it would appear in a URI.

The <domain name part> can reference a registered Internet domain name. The <directory path> can be an arbitrary character string identifying a directory path under the control and management of the entity who owns rights to the identified domain name.

In the TDO model, the combination of <domain name part> and <directory path> can uniquely identify a TPT that can be processed by a receiver to add interactivity to the associated content.

The combination of <domain name part> and <directory path> can be the URL of an Internet location where the TPT for the current segment can be obtained.

That is, the trigger may identify the TPT using <domain name part> and <directory path>. Through <domain name part> and <directory path>, it is possible to confirm the TPT to which the trigger applies. The role performed by applying the trigger to the TPT depends on <parameters>.

Hereinafter, <parameters> will be described.

<parameters> may consist of one or more of "event_time", "media_time", or "spread"

Next, "event_time", "media_time" and "spread" of the syntax shown in FIG. 4 will be described.

event_time="e=" 1*digit["&t="1*7hexdigit]
media_time="m=" 1*7hexdigit
spread="s=" 1*digit The "event_time" term can be used in an Activation trigger to identify the targeted event ("e=" term) and the time the event should be activated ("t=" term). When the "t=" term is absent, that means the event should be activated at the time the trigger arrives.

That is, "e=", which is an interactive event ID term, can reference the appID in the associated TPT of the TDO targeted by the event, the eventID of the specific event, and the dataID of the Data element to be used for this event activation.

"t=", which is an optional timing value term, can indicate a new media timing for the designated event. If the "t=" part is not present, that can mean the timing for the designated event is the arrival time of the Trigger.

The "media_time" term ("m=" term) can be used in a Time base trigger to identify the current time relative to the time base represented by the Time base trigger. Content identifier information ("c=" term) for identifying currently displayed content may be further included in media_time. For "c=" term, the direct execution model will be described below.

That is, "m=", which is a media timestamp term, followed by a character string of 1 to 8 characters in length representing a hexadecimal number, can indicate the current Media Time.

The "spread" term can be used to indicate that any action taken in response to a Time base trigger (such as retrieving a TPT from a server) or an Activation trigger (such as causing a TDO to access a server) should be delayed a random amount of time, to spread out the workload on the server.

"s=" term can indicate the number of seconds of time over which all receivers should attempt to access the Internet server identified in the Trigger. Each individual receiver can be expected to derive a random time within the designated interval and delay the access request by that amount, thereby spreading in time the peak in demand that might otherwise occur at the first appearance of a Trigger at the receiver.

A Trigger containing a <media time> parameter can be called a Time base trigger, since it is used to establish a time base for event times.

A Trigger containing an <event time> parameter can be called an Activation Trigger, since it sets an activation time for an event.

Hereinafter, the life cycle, state and state changing event of the TDO will be described.

A TDO can exist in four different states: Released, Ready, Active and Suspended. A number of different factors can cause a transition from one state to another (trigger, user action, changing channels, etc.).

The TDO may include the following four states.

1. Ready—downloaded and prepared for execution, but not yet executing
2. Active—executing
3. Suspended—temporarily suspended from execution, with its state saved
4. Released—not Ready, Active or Suspended The followings are some of the events that can cause a change of state for a TDO:

1. Trigger "prepare"—Device receives a trigger (in the currently selected primary virtual channel) which requests that the TDO be prepared to execute (allocate resources, load into main memory, etc.)
2. Trigger "execute"—Device receives a trigger (in the currently selected primary virtual channel) which requests that the TDO be activated
3. Trigger "suspend"—Device receives a trigger (in the currently selected primary virtual channel) which directs that the TDO be suspended 4. Trigger "kill"—Device receives a trigger (in the currently selected primary virtual channel) which directs that the TDO be terminated Hereinafter, the TPT will be described.

A TDO Parameters Table (TPT) contains metadata about the TDOs of a segment and the Events targeted to them.

FIGS. 5 and 6 are diagrams showing an embodiment of a TDO parameter table.

Hereinafter, fields included in the table will be described. The sizes of the fields and the types of the fields included in the table may be added or changed according to designer's intention.

The detailed semantics of the fields in the TPT structure is as follows.

TDO parameter table (TPT) may include @majorProtocolVersion, @minorProtocolVersion, @id, @tptVersion, @expireDate, @updatingTime, @serviceID, @baseURL atttributes, Capabilities, LiveTrigger, and/or TDO element.

TPT is the root element of the TPT. One TPT element describes all or a portion (in time) of one programming segment.

@MajorProtocolVersion which can be 4-bit attribute can indicate the major version number of the table definition. The major version number can be set to 1. Receivers are expected to discard instances of the TPT indicating major version values they are not equipped to support.

When present, @MinorProtocolVersion which can be 4-bit attribute can indicate the minor version number of the table definition. When not present, the value defaults to 0. The minor version number can be set to 0. Receivers are expected to not discard instances of the TPT indicating minor version values they are not equipped to support. In this case they are expected to ignore any individual elements or attributes they do not support.

@id, which is URI, can uniquely identify the interactive programming segment which This TPT element pertains to.

@tptVersion, which can be 8-bit integer, can indicate the version number of the tpt element identified by the id attribute. The tptVersion can be incremented whenever any change is made to the TPT.

When present, @expireDate attribute of the TPT element can indicate the date and time of the expiration of the information included in this TPT instance. If the receiver caches the TPT, it can be re-used until the expireDate.

When present, @updatingTime which can be 16-bit element can indicate that the TPT is subject to revision, and it gives the recommended interval in seconds to download the TPT again and check whether the newly downloaded TPT is a new version.

When present, @serviceID which can be 16-bit integer can indicate the NRT service_id associated with the interactive service described in this TPT instance. This is needed for receivers to get FLUTE parameters from the Service Map Table when files for this interactive service are delivered in the broadcast stream.

When present, @baseURL attribute can give a base URL which, when concatenated onto the front of any relative URLs that appear in this TPT. It can give the absolute URLs of the files.

When present, Capabilities element can indicate capabilities that are essential for a meaningful presentation of the interactive service associated with this TPT. Receivers that do not have one or more of the required capabilities are expected not to attempt to present the service.

LiveTrigger element presents if and only if delivery of Activation Triggers via Internet is available. When present, it can provide information needed by a receiver to obtain the Activation Triggers.

The child element and attribute of LiveTrigger will be described below.

TDO which is a child element of the TPT element can represent an application (for example, a TDO), that provides part of the interactive service during the segment described by this TPT instance.

The child element and attribute of TDO will be described below.

@id serves as an identifier of a segment. Accordingly, after a receiver parses the TPT, a trigger, an AMT, etc. related to one segment may match the TPT having @id for identifying the segment using @id information. Accordingly, a segment to which the trigger and the AMT will apply may be found. The details of the AMT will be described below.

LiveTrigger element may include @URL and @pollPeriod attribute.

As described above, LiveTrigger element presents if and only if delivery of Activation Triggers via Internet is available. When present, it can provide information needed by a receiver to obtain the Activation Triggers.

@URL, which is an attribute of the LiveTrigger element, can indicate the URL of a server that can deliver Activation Triggers via Internet. Activation Triggers can be delivered via Internet using HTTP short polling, HTTP long polling, or HTTP streaming, at the option of the interactive service provider.

When present, @pollPeriod, which is an attribute of the LiveTrigger element, can indicate that short polling is being used to deliver Activation Triggers, and the value of the pollPeriod attribute can indicate the recommended time in seconds for the receiver to use as a polling period.

If LiveTrigger element is present, the receiver may parse the TPT and obtain information used to deliver the activation trigger using the Internet. The URL of the server which may receive the activation trigger may be utilized through @URL information. Through @pollPeriod information or information indicating that @pollPeriod attribute is not present, a method of delivering the activation trigger via the Internet and information about the polling period may be obtained. @pollPeriod will be described in detail below.

TDO element may include @appID, @appType, @appName, @globalID, @appVersion, @cookieSpace, @frequencyOfUse, @expireDate, @testTDO, @availInternet, @availBroadcast attribute, URL, Capabilities, Contentitem, and/or Event element.

As described above, TDO which is a child element of the TPT element can represent an application (for example, a TDO), that provides part of the interactive service during the segment described by this TPT instance.

@appID, which can be 16-bit integer, can identify the application uniquely within the scope of the TPT. An Activation Trigger identifies the target application for the Trigger by means of a reference to the appID. @appID is an identifier of an application. One TPT may include several applications (such as TDO). Accordingly, after parsing the TPT, the application may be identified using @appID information. The trigger, AMT, etc. which will apply to one application may match an application having @appID for identifying the application. Accordingly, the application to which the trigger and the AMT will apply may be found. The AMT will be described in detail below.

@appType, which can be 8-bit integer, can indicate the application format type. The default value can be 1, which can represent a TDO. Other values can represent other formats.

@appName, which is attribute of the TDO element, can be a human readable name which can be displayed to a viewer when a viewer's permission is sought to launch the application.

@globalID, which is attribute of the TDO element, can be a globally unique identifier of the application. In many cases a receiver will cache an app that is going to be used again before too long. In order for this to be useful, the receiver must be able to recognize the app the next time it appears. A globalID is needed for the receiver to be able to recognize the app when it appears again in a new segment @appVersion, which is attribute of the TDO element, can be the version number of the application. The appVersion value can be incremented whenever the application (as identified by the globalID) changes. The appVersion attribute cannot be present if the globalID attribute is not present.

@cookieSpace, which can be 8-bit integer, can indicate how much space the application needs to store persistent data between invocations.

@frequencyOfUse, which can be 4-bit integer, can indicate approximately how frequently the application will be used in the broadcast, to provide guidance to receivers on managing their application code cache space. '@frequencyOfUse' will be described in detail below.

@expireDate, which is attribute of the TDO element, can indicate a date and time after which the receiver can safely delete the application and any related resources.

When present with value "true", @testTDO, which is Boolean attribute, can indicate that the application is for testing purposes only, and that it can be ignored by ordinary receivers.

The value "true" for @availInternet attribute can indicate that the application is available for downloading over the Internet. The value "false" can indicate that the application is not available for downloading over the Internet. When the attribute is not present, the default value can be "true".

The value "true" for @availBroadcast attribute can indicate that the application is available for extraction from the broadcast. The value "false" can indicate that the application is not available for extraction from the broadcast. When the attribute is not present, the default value can be "true".

Each instance of URL, a child element of the TDO element, can identify a file which is part of the application. URL element may include @entry attribute.

@entry, an attribute of the URL element, has value "true", that can indicate that the URL is an entry point for the application—i.e., a file that can be launched in order to launch the application. When it has value "false", that can indicate that the URL is not an entry point for the application. The default value when the attribute does not appear can be "false".

The URL element which is the child element of the TDO element identifies a file configuring the application as described above. The receiver parses the TPT to obtain URL information, accesses the server using the URL information, and downloads an application indicated by the URL information.

When present, Capabilities, which is child element of the TDO element, can indicate capabilities that are essential for a meaningful presentation of this application. Receivers that do not have one or more of the required capabilities are expected not to attempt to present launch the application.

ContentItem, a child element of the TDO element, can indicate a content item consisting of one or more data files that are needed by the application. ContentItem element has information about data files required by an application indicated by the TDO element to which this element belongs. The receiver may download data files required by the application using URL information, etc. of ContentItem, if the ContentItem element is present after parsing. The child element and attribute of ContentItem will be described below.

Event, a child element of the TDO element can represent an event for the application. Event element indicates an event of an application to which this element belongs. The event element contains information indicating which events are present, which data is present, which action is present, etc. The receiver may parse the event element to obtain information about the event of the application. The child element and attribute of the event will be described below.

The receiver may receive and parse the TPT to obtain the child element of the TDO and the information about attributes.

ContentItem element which is the child element of the TDO element may include @updateAvail, @pollPeriod, @size, @availInternet, @availBroadcast attribute and/or URL element.

Here, URL element may include @entry attribute.

Each instance of URL, a child element of the ContentItem element, can identify a file which is part of the content item. URL element may include @entry attribute.

@entry, an attribute of the URL element, has value "true", that can indicate that the URL is an entry point for the content item—i.e., a file that can be launched in order to launch the content item. When it has value "false", that can indicate that the URL is not an entry point for the content item. The default value when the attribute does not appear can be "false".

@updatesAvail, which is a boolean attribute of the ContentItem element, can indicate whether or not the content item will be updated from time to time—i.e., whether the content item consists of static files or whether it is a real-time data feed. When the value is "true" the content item will be updated from time to time; when the value is "false" the content item will not be updated. The default value when this attribute does not appear can be false.

@pollPeriod, which is an attribute of the ContentItem element, may be present only when the value of the updatesAvail attribute is "true". The presence of the pollPeriod attribute can indicate that short polling is being used to deliver Activation Triggers, and the value of the pollPeriod attribute can indicate the recommended time in seconds for the receiver to use as a polling period.

@Size, which is an attribute of the ContentItem element, can indicate the size of the content item.

The value "true" for @availInternet attribute can indicate that the content item is available for downloading over the Internet. The value "false" can indicate that the content item is not available for downloading over the Internet. When this attribute is not present, the default value can be "true."

The value "true" for @availBroadcast attribute can indicate that the content item is available for extraction from the broadcast. The value "false" can indicate that the content item is not available for extraction from the broadcast. When this attribute is not present, the default value can be "true."

The receiver may download data files required by the application using URL information of ContentItem after parsing. In this process, the information such as the above-described other attributes may be used.

The event element which is the child element of the TDO element may include @eventID, @action, @destination, @diffusion attribute and/or Data element. Here, the data element may include @dataID attribute.

@eventID, which can be a 16-bit integer attribute of the Event element, can identify the event uniquely within the scope of the TDO element containing it. An Activation Trigger (or activation element in AMT) can identify the target application and event for the Trigger by the combination of appID and eventID. When an event is activated, receivers pass the event in to the application.

@action, which is an attribute of the Event element, can indicate the type of action to be applied when the event is activated. Allowed values can be "prep", "exec", "susp", and "kill"

"prep" can correspond to the "Trig prep" action. If the state of the targeted application is "Released," this action can cause a state change to "Ready."

"exec" can correspond to the "Trig exec" action. The state of the targeted application can become "Active" upon reception of this trigger.

"susp" can correspond to the "Trig susp" action. If the state of the targeted application is "Active," the state can change to "Suspended" upon reception of this trigger, otherwise there is no change.

"kill" can correspond to the "Trig kill" action. The state of the targeted application can become "Released" upon reception of this trigger.

@destination, which is an attribute of the Event element, can indicate the target device for the event. @destination will be described in detail below.

When present, @diffusion, which can be an 8-bit integer attribute of the Event element, can represent a period T of time in seconds. The purpose of the diffusion parameter is to smooth peaks in server loading. The receiver can be expected to compute a random time in the range 0-T, in increments of 10 milliseconds, and delay this amount before accessing an Internet server to retrieve content referenced by URLs in the TPT.

When present, Data which is a child element of the Event element can provide data related to the event. Different activations of the Event can have different Data elements associated with them. The data element may include @dataID attribute.

@dataID, which is a 16-bit integer attribute, can identify the Data element uniquely within the scope of the Event element containing it. When an activation of an event has data associated with it, the Activation Trigger can identify the Data element by the combination of AppID, EventID, and DataID.

The event element contains information about the event of the application indicated by the TDO element to which the event element belongs. The receiver may parse the event element to obtain information about the event.

@eventID serves as an identifier of an event. Using @eventID information, a trigger, AMT, etc. for activating the event may match an application having @eventID for identifying the event. That is, an Activation Trigger (or activation element in AMT) can identify the target application and event for the Trigger by the combination of appID and eventID. When an event is activated, receivers pass the event in to the application. The AMT will be described in detail below.

@action can indicate the type of action to be applied when the event is activated.

The data element indicates data used for the event. One event element may have several data elements. Data is identified using @dataID attribute of the data element. In the receiver, if the event related to the data is activated, the Activation Trigger (or activation element in AMT) can identify the Data element by the combination of AppID, EventID, and DataID. AMT will be described in detail below.

FIG. 7 is a diagram showing the meaning of "Frequency of Use" attribute values.

The "Meaning" column indicates the frequency of occurrence of segments that contain this application. (An attribute can appear multiple times within a single segment, of course.) The frequencyOfUse attribute cannot be present if the globalID attribute is not present. If the app is going to be cached and used again later, the receiver needs to recognize that it is the same app when it appears again. This requires the globalId attribute.

FIG. 8 is a diagram showing the meaning of "destination" attribute values.

As shown in FIG. 8, the destination attribute value of 0 indicates "reserved", the destination attribute value of 1 indicates primary device only, the destination attribute value of 2 indicates one or more secondary devices only 2, and the destination attribute value of 3 indicates Primary device and/or one or more secondary devices.

FIGS. 9, 10, 11, 12 and 13 are diagrams showing an embodiment of the syntax of binary form of a TDO Parameters Table.

This is the binary format of the above-described TPT structure. This structure is a format necessary when the TPT is transmitted in NRT and is made such that the XML structure of the TPT is suitably transmitted in NRT. The following elements and/or attributes contained in the XML version of the TPT can be omitted from the binary version, since they can be provided by the encapsulation header for delivering the binary table in the broadcast stream: @protocolVersion (major/minor), @serviceID and @tptVersion.

The semantics of the fields are as follows. Fields of the binary format of TDO parameter table of FIGS. 9, 10, 11, 12 and 13 will be sequentially described.

expire_date_included, which can be 1-bit field, can indicate whether the expire_date field is included. The value '1' can mean it is included; the value '0' can mean it is not included.

segment_id_length, which can be a 5-bit field, can indicate the length in bytes of the segment_id field.

segment_id, which is a variable length field, can contain the bytes of the segment id, which can have the same semantics as the "id" attribute of the TPT XML format.

base_URL_length, which can be a 8-bit field, can indicate the length in bytes of the base_URL field.

base_URL, which is a variable length field, can contain the bytes of the base URL, which can have the same semantics as the baseURL attribute of the TPT XML format.

When present, expire_date, which can be a 32-bit field, can indicate the date and time of the expiration of the information included in this TPT instance. If the receiver caches the TPT, it can be re-used until the expireDate. The unsigned integer can be interpreted as the number of GPS seconds since 00:00:00 UTC, 6 Jan. 1980, minus the GPS-UTC_offset. The GPS UTC offset can be an 8-bit unsigned integer that defines the current offset in whole seconds between GPS and UTC time standards.

trigger_server_URL_length, which can be a 8-bit field, can indicate the length in bytes of the trigger_server_URL field. When the value of this field is 0, it can indicate that internet delivery of individual Activation Triggers is not available.

trigger_server_URL, when the value of the trigger_server_URL_length field is not 0, can contain the bytes of the Trigger Server URL, which can have the same semantics as the URL attribute of the LiveTrigger element of the TPT XML format.

trigger_delivery_type, which can be a 1-bit field, can indicate the delivery mode of individual Activation Triggers over the Internet. The value '0' can indicate that HTTP short polling is being used; the value '1' can indicate that either HTTP long polling or HTTP streaming is being used.

poll_period, which can be an 8-bit integer, can indicate the recommended number of seconds between polls, when HTTP short polling is being used.

num_apps_in_table, which can be an 8-bit field, can indicate the number of applications (TDOs) described in this TPT instance.

app_id, which can be a 16-bit field, can contain an identifier for this application (the application described in this iteration of the num_apps_in_table loop). It can be unique within this TPT instance.

app_type_included, which can be a 1-bit field, can indicate whether the app_type field is included for this application. The value '1' can mean it is included; the value '0' can mean it is not included.

app_name_included, which can be a 1-bit field, can indicate whether the app_name field is included for this application. The value '1' can mean it is included; the value '0' can mean it is not included.

global_id_included, which can be a 1-bit field, can indicate whether the global_id field is included for this application. The value '1' can mean it is included; the value '0' can mean it is not included.

app_version_included, which can be a 1-bit field, can indicate whether the app_version field is included for this application. The value '1' can mean it is included; the value '0' can mean it is not included.

cookie_space_included, which can be a 1-bit field, can indicate whether the cookie_space field is included for this application. The value '1' can mean it is included; the value '0' can mean it is not included.

frequency_of_use_included, which can be a 1-bit field, can indicate whether the frequency_of_use field is included for this application. The value '1' can mean it is included; the value '0' can mean it is not included.

expire_date_included, which can be a 1-bit field, can indicate whether the expire_date field is included for this application. The value '1' can mean it is included; the value '0' can mean it is not included.

When present, app_type, which can be an 8-bit field, can indicate the format type of this application. The value 0 can indicate that the application is a TDO. If this field is not present, the value can default to 0. Other values can represent other formats.

When present, app_name_length, which can be an 8-bit field, can indicate the length in bytes of the app_name field immediately following it. The value 0 for this field can indicate that no app_name field is present for this application.

When present, app_name, which is a variable length field, can have the same semantics as the appName attribute of the TDO element in the TPT XML format.

When present, global_id_length, which can be an 8-bit field, can indicate the length in bytes of the global_id field immediately following it. The value 0 for this field can indicate that no global_id field is present for this application.

When present, global_id, which is a variable length field, can have the same semantics as the globalId attribute of the TDO element in the TPT XML format.

When present, app_version, which can be an 8-bit field, has the same semantics as the appVersion attribute of the TDO element in the TPT XML format.

When present, cookie_space, which can be an 8-bit field, can have the same semantics as the cookieSpace attribute of the TDO element in the TPT XML format.

When present, frequency_of_use, which can be an 8-bit field, can have the same semantics as the frequencyOfUse attribute of the TDO element in the TPT XML format.

When present, expire_date, which can be an 8-bit field, can have the same semantics as the expireDate attribute of the TDO element in the TPT XML format.

test_app, which can be a 1-bit field, can indicate whether or not this application is a test application, intended to be ignored by ordinary receivers. The value '1' can mean it is a test application; the value '0' can mean it is not a test application.

available_on_internet, which can be a 1-bit field, can indicate whether or not this application is available via the Internet or not. The value '1' can mean it is available via the Internet; the value '0' can mean it is not available via the Internet.

available_in_broadcast, which can be a 1-bit field, can indicate whether or not this application is available via the broadcast or not. The value '1' can mean it is available via the broadcast; the value '0' can mean it is not available via the broadcast.

number_URLs, which can be a 4-bit field, can indicate the number of files that comprise this application.

URL_length, which can be an 8-bit field, can indicate the length of the URL field following it.

URL, which is a variable length field, can have the same semantics as the URL attribute of the TDO element in the TPT XML format.

number_content_items, which can be an 8-bit field, can indicate the number of content items that are to be downloaded for use by this application.

updates_avail, which can be a 1-bit field, can indicate whether this content item will be updated from time to time—i.e., whether it a set of static files or a real-time data feed. The value '1' can indicate that it will be updated; the value '0' can indicate that it will not be updated.

avail_internet, which can be a 1-bit field, can indicate whether the file(s) that comprise this content item can be downloaded via the Internet or not. The value '1' can mean that they are available for downloading via the Internet; the value '0' can mean they are not available.

avail_broadcast, which can be a 1-bit field, can indicate whether the file(s) that comprise this content item can be downloaded via the broadcast or not. The value '1' can mean that they are available for downloading via the broadcast; the value '0' can mean they are not available.

content_size_included, which can be a 1-bit field, can indicate whether or not the content_size field is included or not for this application. The value '1' can mean it is included; the value '0' can mean it is not included.

number_URLs, which can be a 4-bit field, can indicate the number of files that comprise this content item.

URL_length, which can be an 8-bit field, can indicate the length of the URL field following it.

URL, which is a variable length field, can have the same semantics as the URL attribute of the ContentItem, child element of the TDO element in the TPT XML format.

content_size, which can be a 24-bit field, can have the same semantics as the contentSize attribute of the ContentItem child element of the TDO element in the TPT XML format.

num_content_descriptors, which can be an 8-bit field, can indicate the number of content descriptors in the descriptor loop immediately following it.

content_descriptor( ), which is a variable length field, can be a descriptor conforming to the MPEG-2 descriptor format (tag, length, data). It can provide additional information about this content item. Among the descriptors that may be included in this descriptor loop can be the Capabilities descriptor, indicating receiver capabilities needed for a meaningful presentation of this content item.

number_events, which can be an 8-bit field, can indicate the number of events defined for this TDO.

event_id, which can be a 16-bit field, can contain an identifier for this event (the event described in this iteration of the number_events loop). It can be unique within the scope of this application. The event can be referenced within Activation Triggers by the combination of app_id and event_id.

action, which can be a 5-bit field, can have the same semantics as the action attribute of the Event child element of the TDO element in the TPT XML format.

destination_included, which can be a 1-bit field, can indicate whether or not the destination field is included for this event. The value '1' can indicate that it is included; the value '0' can indicate that it is not included.

diffusion_included, which can be a 1-bit field, can indicate whether or not the diffusion field is included for this event. The value '1' can indicate that it is included; the value '0' can indicate that it is not included.

data_included, which can be a 1-bit field, can indicate whether or not the data_size and data_bytes fields are included for this event. The value '1' can indicate that they are included; the value '0' can indicate that they are not included.

When present, the semantics of destination field can be the same as the semantics of the destination attribute of the Event child element of the TDO element in the TPT XML format.

When present, the semantics of diffusion field can be the same as the semantics of the diffusion attribute of the Event child element of the TDO element in the TPT XML format.

When present, the data_size field can indicate the size of the data_bytes field immediately following it.

When present, the data_bytes field can provide data related to this event. Whenever the event is activated, the target application will be able to read the data and use it to help carry out the desired action. The content of this field can be identical to the content of the corresponding Data child element of the corresponding Event child element of the corresponding TDO element in the TPT XML format, except that this field can contain the raw binary value, and the Data element in the TPT XML format can contain a base64 encoding of the binary value.

num_app_descriptors, which can be an 8-bit field, can indicate the number of descriptors in the descriptor loop immediately following it.

app_descriptor( ), which is a variable length field, can be a descriptor conforming to the MPEG-2 descriptor format (tag, length, data). It can provide additional information about this application (TDO). Among the descriptors that may be included in this descriptor loop is the Capabilities descriptor, indicating receiver capabilities needed for a meaningful presentation of this application.

num_TPT_descriptors, which can be an 8-bit field, can indicate the number of descriptors in the descriptor loop immediately following it.

TPT_descriptor( ), which is a variable length field, can be a descriptor conforming to the MPEG-2 descriptor format (tag, length, data). It can provide additional information about this TPT. Among the descriptors that may be included in this descriptor loop is the Capabilities descriptor, indicating receiver capabilities needed for a meaningful presentation of the interactive service represented by this TPT.

FIG. 14 is a diagram showing an embodiment of an activation message table structure. Hereinafter, fields included in the table will be described. The sizes of the fields and the types of the fields included in the table may be added or changed according to designer's intention.

Hereinafter, the AMT will be described.

An Activation Messages Table (AMT) can contain the equivalent of the Activation Triggers for a segment. Under certain circumstances it can be delivered to receivers in lieu of Activation Triggers. A trigger can be delivered in the closed caption stream, by ACR servers, by a "live trigger" server, and via AMT.

The detailed semantics of the fields in the AMT structure is as follows:

An Activation Messages Table (AMT) may include @majorProtocolVersion, @minorProtocolVersion, segmentId, @beginMT attribute and/or Activation element.

@majorProtocolVersion, which can be a 4-bit attribute of the AMT element, can indicate the major version number of the AMT definition. The major version number can be set to 1. Receivers can be expected to discard instances of the AMT indicating major version values they are not equipped to support.

When present, @minorProtocolVersion, which can be a 4-bit attribute of the AMT element, can indicate the minor version number of the AMT definition. When not present, the value can default to 0. The minor version number can be set to 0. Receivers can be expected to not discard instances of the AMT indicating minor version values they are not equipped to support. In this case they can be expected to ignore any individual elements or attributes they do not support.

@segmentID, which is an identifier of the AMT, matches the identifier of the TPT which contains the applications and events to which the Activations in this AMT apply.

When present, @beginMT, which is an attribute of the AMT element, can indicate the beginning Media Time of the segment for which this AMT instance provides activation times.

Each instance of Activation element of the AMT can represent a command to activate a certain event at a certain time, with certain data associated with the event.

@segmentId may serve as an identifier of the AMT. Accordingly, the receiver may receive and parse the AMT to identify the AMT via @segmentId information. @segmentId contains information indicating to which segment the AMT applies, matches @id of the TPT related to the segment, and serves to connect the AMT and the TPT. Further, the segment may be identified to provide basic information necessary to identify the target TDO and the event of the activation element of the AMT.

@beginMT may indicate beginning of the media time with respect to a segment to which the AMT will apply. Therefore, it is possible to decide a criterion of a time when activation indicated by the activation element occurs. Accordingly, if @beginMT is present, @startTime attribute in the activation element may be influenced by the beginning of the media time indicated by @beginMT.

A plurality of activation elements may be present in the AMT. Each activation element performs a role similar to that of the activation trigger. The activation element may apply to the segment indicated by @segmentId in the AMT. Attributes of the activation element may contain information about in which application activation occurs, in which event activation occurs, when activation occurs, etc. Attributes of the activation element will be described in detail below.

The activation element may include @targetTDO, @targetEvent, @targetData, @startTime and @endTime attribute.

@targetTDO, which is an attribute of the Activation element, can match the appID attribute of a TDO element in the TPT with which the AMT is associated, thereby identifying the target application for the activation command.

@targetEvent, which is an attribute of the Activation element, can match the eventID attribute of an Event element contained in the TDO element identified by the targetTDO attribute, thereby identifying the target event for the activation command.

@targetData, which is an attribute of the Activation element, can match the dataID attribute of a Data element contained in the Event element identified by the targetTDO and targetEvent attributes, thereby identifying the Data that is to be associated with the target event when the activation command is applied.

@startTime, which is an attribute of the event element, can indicate the start of the valid time period for the event relative to Media Time. Receivers can be expected to execute the command when Media Time reaches the value in startTime, or as soon thereafter as possible.

When present, @endTime, which is an attribute of the event element, can indicate the end of the valid time period for the event relative to Media Time. The receiver can be expected to not execute the command when Media Time is past the value in endTime.

@targetTDO may contain information to which application the activation element of the AMT applies. The receiver may receive and parse the AMT to obtain @targetTDO and find @appID in the TDO element of the matching TPT to identify the application to which the activation element will apply.

@targetEvent may contain information to which event of which application the activation element of the AMT applies. The receiver may receive and parse the AMT to obtain @targetEvent and find @eventID in the TDO element of the matching TPT to identify the event to which the activation element will apply.

@targetData may identify data related to the target event when the activation command applies. The receiver may receive and parse the AMT to obtain @targetData and find @dataID in the event element of the TPT.

@startTime may indicate a start time when the event occurs. This start time is based on the media time. The receiver may parse the AMT to obtain @startTime information and confirm the time when the event occurs using @startTime. The receiver may activate the event if the media time reaches the startTime based on the media time of the segment identified by @segmentId. If startTime has been already elapsed, the event may be activated as soon as possible.

@endTime may indicate the end time of the event. If the media time reaches the endTime, the receiver may not perform the event.

The Activation elements in the AMT can appear in order of ascending startTime values.

When a receiver is activating events according to the Activations in an AMT, it can be expected to apply each activation at its startTime, or as soon thereafter as possible (for example, in the case when a receiver joins the service and receives the AMT at some time after the startTime and before the endTime). If the "action" attribute of the event element in TPT is "exec", then the receiver can be expected to pass a TriggerEvent in to the target application. TriggerEvent will be described below in the part related to the API.

Hereinafter, the URL list will be described.

A URL List can contain certain URLs of potential use to a receiver. The URL list may include the following URLs, etc.

1. URL for TPTs for one or more future segments, allowing a receiver to pre-download files.

2. URL of an NRT Signaling Server from which information about stand-alone NRT services in the broadcast stream can be retrieved, allowing a receiver to access those services even if it does not have access to delivery of NRT service signaling in the broadcast stream.

3. URL of a Usage Reporting Server to which usage reports can be sent for a virtual channel, allowing a receiver to send in such reports even if it does not have access to delivery of this URL in the broadcast stream.

4. URL of the PDI-Q Table for a virtual channel, allowing a receiver to personalize the viewing experience even if it does not have access to the PDI-Q Table delivered in the broadcast stream. (The PDI-Q Table is related to personalization for providing a service customized for the user in provision of the interactive service. It is possible to inquire the user about personalization via the PDI-Q table.)

Among others, the URL list may be made with respect to the UsrUrl element so as to further indicate the URL of the server for usage reporting, in order to use preferred data and the type of content viewed and consumed currently through the receiver in business. The UsrUrl element included in the URL list may be variously interpreted as follows.

First, in case of a usage reporting server, the receiver may perform the usage reporting function of the receiver by a predetermined protocol (e.g., data structure, XML file, etc.) with the URL of the usage reporting server.

Second, there may be a TDO executed on the web browser of the receiver. In this case, this indicates the location of the Usage Reporting TDO. In this case, the TDO may directly collect and report information about content stored in the receiver or consumed currently using the API (e.g., file APIs or usage reporting APIs) of the web browser of the receiver. The TDO may transmit the collected data using Javascript API called XMLHttpRequest.

FIG. 15 is a diagram showing an embodiment of a URL List structural diagram.

URLlist may include UrlList, TptUrl, UrsUrl, and/or PdiUrl. The semantics of these elements is as follows.

TptUrl, which is an element of the UrlList element, can contain the URL of a TPT for a future segment in the current interactive adjunct service. When multiple TptUrl elements are included, they can be arranged in order of the appearance of the segments in the broadcast.

NrtSignalingUrl, which is an element of the UrlList element, can contain the URL of a server from which receivers can obtain NRT signaling tables for all the virtual channels in the current transport stream.

UrsUrl, which is an element of the UrlList element, can contain the URL of a server to which receivers can send usage (audience measurement) reports for the current virtual channel.

PdiUrl, which is an element of the UrlList element, can contain the URL of the PDI-Q table for the current virtual channel.

Hereinafter, the delivery mechanism will be described.

Hereinafter, Output from Interactive Service Creation, Delivery of Triggers in the Broadcast Stream, Delivery of Time base triggers via the Internet, Delivery of Activation Triggers via Internet (ACR Scenario), Delivery of TPTs in Broadcast Stream, Delivery of TPTs via Internet, Moving TDOs and Content Items, Combining Multiple Segments into One Segment will be sequentially described.

Hereinafter, Output from Interactive Service Creation will be described.

The process of service creation for a segment can result in folder containing all TDOs and other content items, TPT file in XML format and AMT file in XML format. The other results may be created.

Hereinafter, Delivery of Triggers in the Broadcast Stream will be described.

When delivered in the broadcast stream, Triggers can be delivered in the DTV Closed Caption channel, in Service #6, in the URLString command.

If the Trigger is less than or equal to 26 characters in length, it can be sent non-segmented (Type=11). If the Trigger is 27 to 52 characters in length, it can be sent in two segments (the first segment in a Type=00 segment and the second segment in a Type=10 segment).

The type of URI delivered in any given instance of the command can be given by an 8-bit parameter.

For interactive services using the TDO model, the URI type of the URI data structure can be set to 0 (Interactive TV Trigger for TDO model). This delivery mechanism includes both Time base triggers and Activation Triggers.

In the case in which the time base trigger is delivered via a broadcast stream (in closed caption service #6), if "m=" term is absent, Time base triggers can simply deliver URL of Signaling Server. And if "m=" term is absent, then "t=" term must be absent from Activation triggers.

In the case in which the activation trigger is delivered via a broadcast stream (in closed caption service #6), that is, in the case of "Trigger" format, with "e=" term, with or without "t=" term, if "t=" term is present, activation time can be the timestamp relative to a time base. And if "t=" term is absent, activation time can be the arrival time of the message.

In the case in which the time base trigger and the activation trigger are delivered via CC service #6, there can be three possible ways for broadcasters to handle Time Base and Activation triggers:

1. Segment mode without explicit time base
2. Segment mode with explicit time base
3. Service mode with explicit time base These can be mixed within a broadcast, on a segment by segment basis.

In segment mode without explicit time base, Activation messages include no time stamp, so that the activation time of each message can be the delivery time of the message, and Time Base messages also include no time stamp, so that their only purpose can be to provide the URL of the Signaling Server that can deliver TPT files. Time Base messages can even be omitted entirely in this mode, relying on the URL in the Activation messages to provide the URL of the Signaling Server, but then receivers will not be able to retrieve a TPT and start downloading TDOs until after the first Activation message appears, delaying the response to the first Activation message by quite a bit.

In this case Time Base messages that can appear in CC service #6 can contain the "locator_part" of the "Trigger" format and possibly the "spread" term, but no "media_time" term, and Activation messages that can appear in CC service #6 can contain the "locator_part" of the "Trigger" format, the "event_time" term, and possibly the "spread" term, but with no "t=" part in the "event_time" term. The "locator_part" of both Time Base and Activation messages can be the current segmentId. This URL can also be used to retrieve the TPT for the segment via the Internet.

In segment mode with explicit time base, Time Base messages include a time stamp, to define a timebase, and Activation messages might include a time stamp, to define the activation time relative to the time base, or they might include no time stamp, indicating that the activation time is the arrival time of the message.

In this case Time Base messages that can appear in CC service #6 can contain the "locator_part" of the "Trigger" format, the "media_time" term, and possibly the "spread" term, and Activation messages that can appear in CC service #6 can contain the "locator_part" of the "Trigger" format, the "event_time" term, and possibly the "spread" term, with or without the "t=" part in the "event_time" term. The "locator_part" of both Time Base and Activation messages can be the current segmentId, and the time base is specific to the segment. This URL can also be used to retrieve the TPT for the segment via the Internet.

In service mode with explicit time base, Time Base messages include a time stamp, to define a time base, and Activation messages might or might not include a time stamp. The time base can extend across multiple segments, rather than being specific to a single segment. The "locator_part" of the Time Base messages can be an identifier of the time base, and also a URL that can be used to retrieve TPTs for the service via the Internet.

In any case the Trigger Insertion Server that inserts the triggers into CC service #6 should work from the AMT, translating the Activation messages from the XML format in the AMT into the trigger format specified for delivery in CC service #6. In the case of an Activation element with no endTime attribute, a single trigger can be inserted with activation time equal to the startTime attribute. In the case of an Activation element with both startTime and endTime elements, a sequence of triggers can be inserted with same target. The first trigger in the sequence can have activation time equal to the startTime attribute, the last trigger in the sequence can have activation time equal to the endTime attribute, and there can be a fixed time interval between the activation times of the triggers in the sequence (except that the interval between the next-to-last and last trigger in the sequence can be shorter). The length of this fixed time interval can be configurable.

When the Time Base and Activation messages are in segment mode, the time base can be specific to the segment. It can start with the "beginMT" value at the beginning of the segment, and run through the segment. The "startTime" and "endTime" values of individual Activations can be relative to the "beginMT" value. When the Time Base and Activation messages are in service mode, the time base can span segments, and the "beginMT" value for each segment can be adjusted to take account of the service time base and the broadcast schedule.

Hereinafter, Delivery of Time base triggers via the Internet will be described.

Internet delivery of Time base triggers can be useful in so-called Automatic Content Recognition (ACR) situations, where the recipient of the Time base triggers has no access to Closed Caption service #6. In these situations the receiver needs to use ACR in order to recognize video frames and synchronize the time base with them. In ACR situations Time Base messages can be obtained from watermarks or from ACR servers. In case of reception from the ACR server, the Time Base messages are delivered as responses from an ACR server.

Hereinafter, Delivery of Activation Triggers via Internet (ACR Scenario) will be described.

Activation messages can be delivered via short polling, long polling or streaming, but all of these can impose a lot of overhead on the receivers and the server. Activation messages can also be delivered in the form of an AMT, but this can provide a good deal of information about the length of segments, facilitating ad killers. There might be other alternatives.

In the case in which the activation message is delivered in the form of the activation trigger, that is, in case of "Trigger" format with "e=" term, with or without "t" term, this may be delivered via HTTP short polling, long polling or streaming.

When delivered via Internet, Activation messages can be delivered using either or both of the following mechanisms:
 1. Individual Activation Trigger Delivery
 2. Bulk Activation Trigger Delivery Hereinafter, Individual Activation Trigger Delivery will be described.

As described above, when individual Activation Triggers are delivered via the Internet, they can be delivered using HTTP short polling, long polling or streaming. The format of the Activation Trigger can be exactly the same as when they are delivered via DTVCC service #6.

In case of short polling, the polling period must be specified. In this period, a short polling operation may be set using pollPeriod included in the TPT as described below.

When Internet delivery of Activation Triggers is available, the URL attribute of the LiveTrigger element in the TPT can indicate the Activation Trigger Server which can deliver activation trigger. If the pollPeriod attribute of the LiveTrigger element is present in the TPT, this can indicate that HTTP short polling is being used, and it can indicate the polling period a receiver should use. If the pollPeriod attribute of the LiveTrigger element is not present in the TPT, this can indicate that either HTTP long polling or HTTP streaming is being used.

Regardless of which protocol is being used, the receiver can be expected to issue an HTTP request to the Activation Trigger Server with the query term:
 ?mt=<media_time>
 where <media_time> can be the current media time of the viewed content.

If short polling is being used, the response from the Activation Trigger Server can contain all the Triggers that have been issued within the time interval of length pollPeriod ending at <media_time>. If more than one Activation Trigger is returned, they can be separated by one or more white space characters. If no Activation Triggers are returned, the response can be empty.

If HTTP long polling or HTTP streaming is being used, the Activation Trigger Server can wait to return a response until the media time when an Activation Trigger would be delivered in the broadcast stream. At this time it can return the Activation Trigger.

If HTTP long polling is being used, the Activation Trigger Server can close the session after returning an Activation Trigger. The receiver can be expected to immediately issue another request, with an updated media time.

If HTTP streaming is being used, the Activation Trigger Server can keep the session open after returning each Activation Trigger, and it can deliver additional Activation Triggers over the session as the time arrives for them to be delivered.

In all cases the HTTP response can contain an HTTP Response Header Field of one of the following forms to signal the delivery mode:
 ATSC-Delivery-Mode: ShortPolling [<poll-period>]
 ATSC-Delivery-Mode: LongPolling
 ATSC-Delivery-Mode: Streaming The <poll-period> parameter can indicate the recommended interval between polls for the succeeding polls. The <poll-period> can be omitted.

Hereinafter, Bulk Activation Trigger Delivery will be described.

When Activation Triggers are delivered via the Internet in bulk, the Activation Triggers for a segment can be delivered via HTTP along with the TPT for the segment, in the form of a multi-part MIME message, with the TPT as the first part of the message, and an Activation Messages Table (AMT) as the second part of the message.

FIG. 16 is a diagram showing an embodiment of the binary format for the private sections containing TPTs. The below-described NRT-style private section may be equal to FIG. 16.

Hereinafter, Delivery of TPTs in Broadcast Stream will e described.

When delivered in the broadcast stream, TPTs can be translated from their XML format into an equivalent binary NRT-style signaling table format and encapsulated in NRT-style private sections, one TPT per table instance. The TPT for the current segment is always present. TPTs for one or more future segments may also be present. The TPT instance is defined by the value of its segment_id field. For reference, the binary format of the TDO parameter table was described above.

In summary, in order to transmit the binary structure of the TPT in NRT, the TPT may have a section structure suitable for NRT transmission. Hereinafter, this process will be described in detail.

Each TPT can be encapsulated in NRT-style private sections by dividing each TPT into blocks and inserting the blocks into the tpt_bytes( ) fields of sections that have a common value of table_id, protocol_version TPT_data_version and sequence_number fields. The blocks can be inserted into the sections in order of ascending section_number field values. The private sections can be carried in the Service Signaling Channel (SSC) of the IP subnet of the virtual channel to which the TPT pertains. Here, "Service Signaling Channel" is defined in the ATSC-NRT standard and means a channel having a specific IP address and a port number. The sequence_number fields in the sections can be used to distinguish different TPT instances carried in the same SSC.

The private section (tpt_section( )) may include table_id, protocol_version, sequence_number, TPT_data_version, current_next_indicator, section_number, last_section_number, and/or service_id, and tpt_bytes( ) information.

Hereinafter, the fields of FIG. 16 will be described.

table_id, which can be an 8-bit field, can identify this table section as belonging to a TDO Parameters Table instance.

protocol_version may be divided into two parts. The high order 4 bits of this 8-bit unsigned integer field can indicate the major version number of the definition of this table and the TPT instance carried in it, and the low order 4 bits can indicate the minor version number. The major version number can be set to 1. Receivers can be expected to discard instances of the AMT indicating major version values they are not equipped to support. The minor version number can be set to 0. Receivers can be expected to not discard instances of the AMT indicating minor version values they are not equipped to support. In this case they can be expected to ignore any descriptors they do not recognize, and to ignore any fields that they do not support.

sequence_number can be an 8-bit field. The value of sequence_number can be the same as the sequence_number of all other sections of this TPT instance and different from the sequence_number of all sections of any other TPT instance in this Service Signaling Channel. Accordingly, this field may perform a role different from that of the other TPT instance. sequence_number field may indicate an IP subnet associated with a service signaling channel in this section. The values of the sequence_number fields of the different TPT instances can reflect the order in which the segments appear in the broadcast stream.

TPT_data_version, which can be a 5-bit field, can indicate the version number of this TPT instance, where the TPT instance can be defined by its segment_id. Since the TPT version is known in advance in order to determine whether the received TPT section data is a new version TPT, the TPT_data_version field may be present in the section table. The version number can be incremented by 1 modulo 32 when any field in the TPT instance changes.

current_next_indicator, which can be a 1-bit indicator, can always be set to '1' for TPT sections, indicating that the TPT sent is always the current TPT for the segment identified by its segment_id.

section_number, which can be an 8-bit field, can give the section number of this TPT instance section, where the TPT instance can be identified by its segment_id. The section_number of the first section in an TPT instance can be 0x00. The section_number can be incremented by 1 with each additional section in the TPT instance.

last_section_number, which can be an 8-bit field, can give the number of the last section (i.e., the section with the highest section_number) of the TPT instance of which this section is a part.

service_id, which can be a 16-bit field, can specify the service_id associated with the interactive service offering the content items described in this table instance.

tpt_bytes( ), which is a variable length field, can consist of a block of the TPT instance carried in part by this section. When the tpt_bytes( ) fields of all the sections of this table instance are concatenated in order of their section_number fields, the result can be the complete TPT instance.

That is, after the binary format of the TPT is used or the XML format is changed to a binary format, the TPT may be divided to be suitable for NRT transmission, included in tpt_bytes( ) field of the private section, and transmitted in NRT. At this time, if one TPT is divided into several private sections, the private section may have the same table_id, protocol_version TPT_data_version and sequence_number value. The divided TPT blocks may be inserted in order of section_number field values.

The receiver may parse the received private sections. In order to combine the private sections into one TPT again, the private sections having the same table_id, protocol_version TPT_data_version and sequence_number values may be used. At this time, order information capable of being obtained from section_number and last_section_number information may be used. If tpt_bytes( ) of all private sections having the same table_id, protocol_version TPT-_data_version and sequence_number values are sequentially connected, one TPT may be created.

Hereinafter, Delivery of TPTs via Internet will be described.

When delivered over the Internet, TPTs can be delivered via HTTP. The URL of the TPT for the current segment can be the "<domain name part>/<directory path>" in Time Base messages. The response to a request for a TPT can consist of just the TPT, or it can consist of a 2-part MIME message, with the requested TPT in the first part and a list of URLs in the second part, encoded as an XML document. (The response to a request will always include the TPT for the current segment. It may include TPTs for one or more future segments as well.)

FIG. 17 is a diagram showing an embodiment of a list of URLs encoded as an XML document.

The URLs as the second part of the above-described response may have the format shown in FIG. 17.

The semantics of the elements of FIG. 17 will be described.

"UrlList" can contain a list of URLs that are useful to a receiver.

"TptUrl" can contain the URL of a TPT for a future segment. When multiple TptUrl elements are included, they can be arranged in order of the appearance of the segments in the broadcast.

"NrtSignalingUrl" can contain the URL of a server where receivers can obtain NRT signaling tables for all the virtual channels in the current broadcast stream.

Hereinafter, Moving TDOs and Content Items will be described.

Networks and stations will often need to provide their own HTTP servers for delivering TDOs and content items (files) used by TDOs. When this is done, the baseURL in the TPT can be adjusted to reflect the location of the server.

Hereinafter, Combining Multiple Segments into One Segment will be described.

In order to thoroughly obfuscate boundaries between segments, the TPTs and AMTs for multiple segments can be combined into a single TPT and AMT. The following steps may be performed.

1. Identify the set of segments to be combined.
2. Create a new TPT with a new segmentId.
3. If any of the segments being combined have live activations, provide a relay server that provides access to all of them, and put the parameters for this server in the "LiveTrigger" element.
4. Apply the baseURL for each segment as needed to get the full TDO and ContentItem URLs. (It may be possible to identify a shorter baseURL that is common to all the segments being combined, and retain that as a baseURL for the combined segment.)
5. Revise appId values as needed to remove conflicts.
6. Insert into the new TPT all the revised TDO elements for all the segments being combined
7. Create a new AMT with segmentId equal to the new segmentId of the combined TPT.
8. Select an appropriate new "beginMT" value for the new AMT.
9. Adjust the targetId values of all the Activation elements in the AMT files for the segments being combined to reflect any changes in appId values.
10. Adjust the startTime and endTime values of all the Activation elements in the AMT files for the segments being combined to reflect the new "beginMT" value and the broadcast schedule for the segments being combined.

11. Insert all the revised Activation elements into the new AMT.

Hereinafter, ATSC JavaScript APIs for an environment for executing DO will be described.

In order to support synchronization of Declarative Object actions to broadcast programming, additional methods can be supported for the video/broadcast object.

If the TPT is received via the DTVCC or the Internet, several events for executing the TDO may be present in the TPT and these events may be activated by the activation trigger.

In order to process this event, a Listener function may be registered on a per eventID basis. Accordingly, as the above-described 'additional methods', the following two functions for registering the Listener function may be present.

1. addTriggerEventListener
: Register a callback function (listener function) for processing an event generated on a per eventId basis.
2. removeTriggerEventListener
: Cancel registration of a callback function (listener function) for processing an event generated on a per eventId basis.

FIG. 18 is a diagram showing an embodiment of addTriggerEventListener.

In FIG. 18, addTriggerEventListener is described and format, arguments, etc. are shown.

The addTriggerEventListener function may receive the listener of EventListener type and eventId of Number type as argument. EventListener type will be described below. The addTriggerEventListener function may not have a return value (void).

Here, eventId argument may be event ID in the event element of the TPT. Here, listener argument may be a listener for the event.

The trigger processing module of the receiver may register the listener function on a per eventId basis using the "addTriggerEventListener" function as soon as the activation message is received. If the event is activated, the registered listener function may be called. At this time, the object of TriggerEvent type may be delivered to the listener function. TriggerEvent type will be described below.

FIG. 19 is a diagram showing an embodiment of removeTriggerEventListener.

In FIG. 19, removeTriggerEventListener is described and format, arguments, etc. are shown.

The removeTriggerEventListener function may receive the listener of EventListener type and eventId of Number type as argument. EventListener type will be described below. The removeTriggerEventListener function may not have a return value (void).

Here, the eventide argument may be eventide in the event element of the TPT. Here, the listener argument may be a listener for the event.

In the javascript program, if the event which may be generated on a per eventId basis is desired to be no longer received or if the program "DestroyWindow" is finished, the listener function registered using "removeTriggerEventListener" may be cancelled.

FIG. 20 is a diagram showing an embodiment of the definition of the EventListener type.

EventListener type may have an event TriggerEvent type as argument. EventListener may be an interface.

FIG. 21 is a diagram showing an embodiment of the definition of the TriggerEvent type.

TriggerEvent type may contain information about the event.

TriggerEvent type may have eventId, data and status as properties. Here, eventId may be eventID in the event element of the TPT. Here, data may be data for this activation of the event. Here, data may be hexadecimal. Here, status may mean the status of the event. Here, if the status value is "trigger", this means a status in which the event is activated by the activation trigger. If the status value is "error", this means a status in which error occurs.

FIG. 22 is a diagram showing an embodiment of a transmission method in a TDO model.

The transmission method according to the embodiment of the present invention may include generating an application parameter table (su010), generating an activation message table (su020), generating a multi-part message (su030), and transmitting the multi-part message (su040).

In step of generating an application parameter table (su010), the application parameter table to be transmitted by the transmitter is generated. Here, an application parameter table can include information about at least one of applications. Here, the application parameter table can include a first identifier and a second identifier. Here, the first identifier can identify an interactive programming segment which application parameter table pertains to. In addition, the second identifier can identify an application within the scope of application parameter table.

The application parameter table contains information about the application and the examples thereof include the above-described TDO parameter table (TPT). The application parameter table may include version information of an application parameter table, version information of an application, an identifier of a segment to which the application will apply, an identifier of an application, and an identifier of an event.

The first identifier can identify an interactive programming segment which application parameter table pertains to. The first identifier may be @id attribute included in the above-described TPT.

The second identifier can identify an application within the scope of application parameter table. The second identifier may be @appID attribute of the TDO element which is the child element of the above-described TPT.

The receiver may receive and parse the TPT so as to obtain the first identifier and the second identifier. Using the first identifier, the application may be associated with the application parameter table to which the first identifier belongs and the applications associated with the application parameter table and a segment to which the events will apply may be found. Using the second identifier, an application to which the activation message will apply may be found. The receiver may match the activation messages with the event to be activated using the above-described identifiers.

In step of generating an application parameter table (su010), in the embodiment of the present invention, the application parameter table may further include a fifth identifier. The fifth identifier can identify the event targeted to the application. The fifth identifier may correspond to @eventID which is the attribute of the event element in the TDO element which is the child element of the above-described TPT. The fifth identifier may match a sixth identifier of the AMF. Operation of the sixth identifier and operation matching the sixth identifier with the fifth identifier will be described below in step of generating an activation message table (su020).

In step of generating an application parameter table (su010), in the embodiment of the present invention, the application parameter table may further include version information. The version information can indicate a version number of a definition of the application parameter table. The version information may correspond to @tptVersion which is the attribute of the above-described TPT. The receiver may parse the TPT or the application parameter table to obtain the version information.

In step of generating an application parameter table (su010), in the embodiment of the present invention, the application parameter table may further include a seventh identifier. Here, the seventh identifier can identify data to be used for the event identified by the fifth identifier. Here, the fifth identifier is equal to the above-described fifth identifier. The seventh identifier may correspond to @dataID which is the attribute of the data element in the TDO element which is the child element of the above-described TPT. The seventh identifier may match an eighth identifier of the AMF. Operation of the eighth identifier and operation of matching the eighth identifier with the seventh identifier will be described below in step of generating an activation message table (su020).

In step of generating an application parameter table (su010), in the embodiment of the present invention, the application may be a Triggered Declarative Object (TDO) and the application parameter table may be a TDO parameter table. The TDO and TPT are equal to the above-described TDO and TPT.

In step of generating an activation message table (su020), the activation message table to be transmitted by the transmitter is generated. Here, an activation message file that can indicate at least one of activation times of the applications. Here, the activation time can mean a time of activation. Here, the activation message file can include a third identifier and activation messages. Here, the third identifier can match the first identifier of application parameter table which contains the applications to which the activation messages in the activation message file apply. Here, the activation message can include a fourth identifier and start time information. Here, the fourth identifier can match the second identifier of the application in the application parameter table with which the activation message file is associated. In addition, the start time information can indicate the start of time period for an event targeted to the application relative to time of the segment.

The activation message file may be above-described Activation Message Table (AMT). Since a plurality of activation messages may be included, a plurality of activation messages related to a specific segment may be simultaneously delivered. The activation message file may contain version information, an identifier of a related segment, information about each activation message, etc.

The activation time may mean a time when general activation occurs.

The third identifier may correspond to @segmentId of the above-described AMT. By identifying a related segment as the identifier of the activation message file, the activation message file may match the application parameter table.

The activation message may correspond to activation which is the child element in the above-described AMT. Accordingly, the activation message may contain an identifier of a target application, an identifier of a target event, and an activation start time.

The fourth identifier may be @targetTDO attribute of activation which is the child element of the above-described AMT. Accordingly, it is possible to identify a target application of an activation command.

The start time information may be @startTime attribute of activation which is the child element of the above-described AMT. Accordingly, information about the execution start time may be contained.

The receiver may parse the received activation message file to obtain information such as activation message, third identifier, fourth identifier, and start time information. The parsed third identifier may match the information about the parsed first identifier in the application parameter table. The first identifier can be an identifier of application parameter table which contains the applications to which the activation messages in the activation message file apply. In addition, the third identifier is an identifier for a segment to which the activation message applies and may match the first identifier to connect the application parameter table and AMF.

The parsed fourth identifier may match the parsed second identifier information in the TPT. The second identifier can be an identifier of the application in the application parameter table with which the activation message file is associated. In addition, the fourth identifier is an identifier of an application to which the activation command applies and may match the second identifier to be connected with the application in the TPT to which the activation message in the AMF applies.

The parsed start time information may indicate an activation start time of an event to be activated by the activation message of the AMF. This may be time information relative to the time of a segment. It is possible to indicate the activation start time of the event, to which the activation message applies, with respect to the application specified by the parsed @segmentId and @targetTDO information.

In step of generating an activation message table (su020), in the embodiment of the present invention, the activation message may further include a sixth identifier. The sixth identifier may identify an event to which an activation command will apply. The sixth identifier may correspond to @targetEvent in the activation which is the child element of the above-described AMT. The sixth identifier can match the fifth identifier of the application identified by the fourth identifier. Here, the fourth identifier is equal to the above-described fourth identifier. If the receiver parses the activation message file to obtain the sixth identifier, the sixth identifier may match the fifth identifier obtained by parsing the application parameter table. Through such matching, the event to be activated by the activation message may be connected to the corresponding event information of the application and the event may be activated to activate the activation message.

In step of generating an activation message table (su020), in the embodiment of the present invention, if the activation message file is received later than a time specified by the start time information, activation may immediately occur.

In step of generating an activation message table (su020), in the embodiment of the present invention, the activation message may further include an eighth identifier. Here, the eighth identifier may identify data related to the target event. The eight identifier may correspond to @targetData which is the attribute of activation which is the child element of the above-described AMT. The eighth identifier can match the seventh identifier of the application identified by the fourth identifier. Here, the fourth identifier is equal to the above-described fourth identifier. The receiver may match the eighth identifier of the parsed AMT with the seventh identifier of the parsed application parameter table. Therefore, it is possible to identify data related to the target event of the application message and associate the data with data information in the application parameter table.

In step of generating an activation message table (su020), in the embodiment of the present invention, the activation message may include end time information. Here, the end time information can indicate the end of time period for the event, relative to the time of the segment. After the time indicated by the end time information has been elapsed, event activation may be stopped. That is, the event may be activated between the start time indicated by the start time information and the end time indicated by the end time information.

In step of generating an activation message table (su020), in the embodiment of the present invention, the time of the segment may be the media time of the segment. Here, the media time of the segment can be a parameter referencing a point in a playout of a content item.

Step of generating a multi-part message (su030) is the step of generating a multi-part message with the application parameter table as the first part of the multi-part message and the activation message file as the second part of the multi-part message. Here, the application parameter table and the activation message file are equal to the application parameter table and the activation message file.

As described in bulk activation trigger delivery, if a bulk of activation triggers is delivered via the Internet, the activation triggers may be delivered in the form of a multi-part MIME message. In step of generating a multi-part message (su030), prior to transmission of the application parameter table and the activation message file, it is possible to generate a multi-part message in which the application parameter table and the activation message file are respectively a first part and a second part.

The receiver may receive and parse the multi-part message to obtain information about the application parameter table and the activation message file. Operation of the receiver will be described below.

Transmitting the multi-part message (su040) is the step of transmitting the multi-part message to receiver via HTTP.

As described in bulk activation trigger delivery, if a bulk of activation triggers is delivered via the Internet, the Activation Triggers for a segment can be delivered via HTTP. The receiver receives the multi-part message. Operation of the receiver will be described below.

Figure 23:
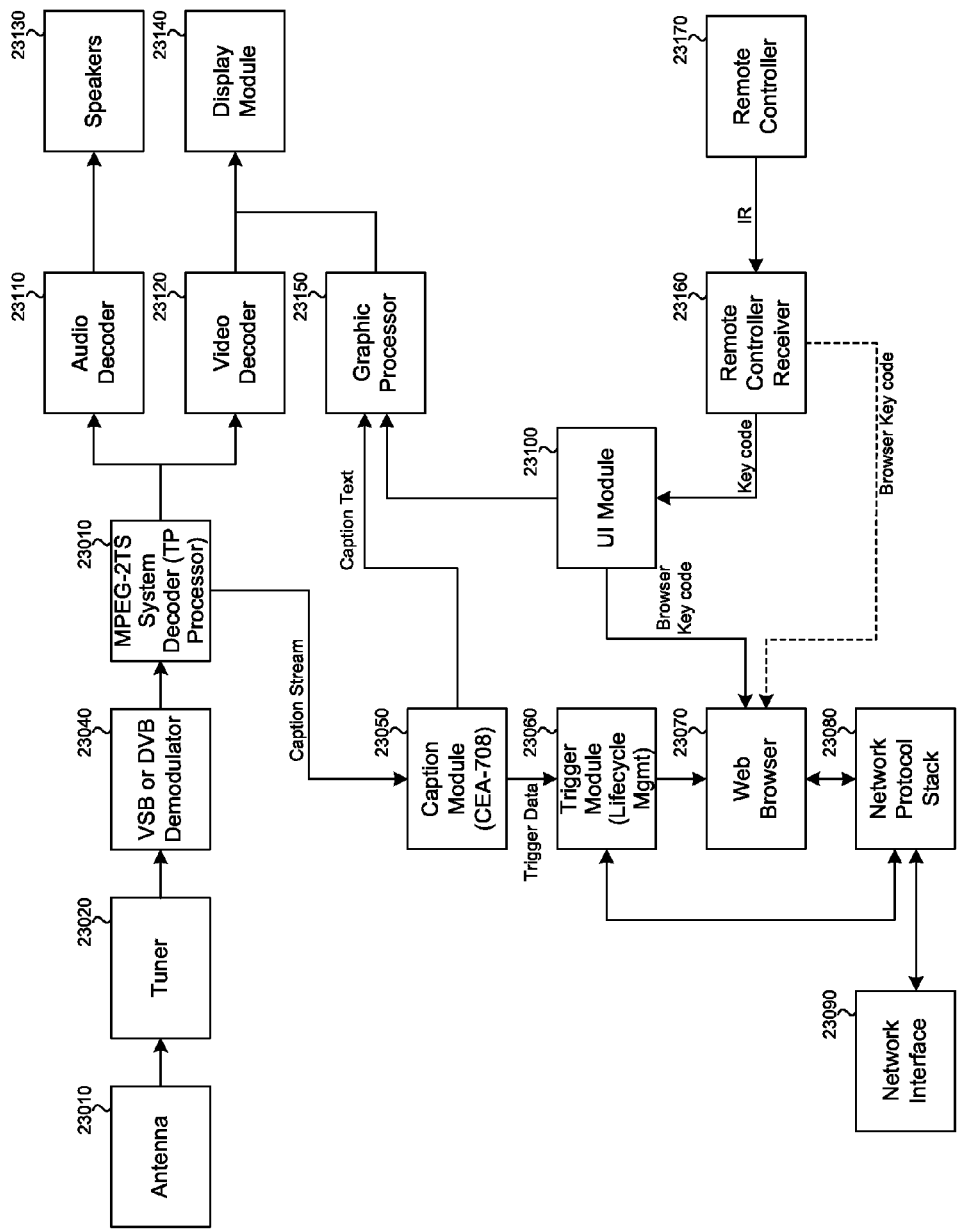
FIG. 23 is a diagram showing the structure of a receiver according to an embodiment of the present invention.

FIG. 23 is a diagram showing the structure of a receiver according to an embodiment of the present invention.

In the embodiment of the present invention, the receiver may include an antenna 23010, a tuner 23020, a VSB or DVB Demodulator 23030, an MPEG-2TS System Decoder 23040, a caption module 23050, a trigger module 23060, a web browser 23070, a network protocol stack 23080, a network interface 23090, a UI module 23100, an audio decoder 23110, a video decoder 23120, a speaker 23130, a display module 23140, a graphic processor 23150, a remote controller receiver 23160 and/or a remote controller 23170.

The antenna 23010 may receive a broadcast signal according to a broadcast stream. Here, the antenna 23010 may be one generally used in the technical field.

The tuner 23020 may seek or tune to a channel of the receiver and may include a radio frequency amplifier, a local oscillator, a frequency conversion and input circuit, a seeker, etc. The tuner 23020 may be one generally used in the technical field.

The VSB or DVB demodulator 23030 may modulate a VSB signal or a DVB signal. The VSB or DVB demodulator 23030 may restore the modulated VSB or DVB (e.g., OFDM-modulated signal) to an original signal. The demodulation process of the VSB or DVB demodulator 23030 may be one generally used in the technical field.

The MPEG-2TS system decoder 23040 decodes the transport stream (TS) of the demodulated signal. The MPEG-2TS system decoder 23040 may obtain and deliver a caption stream from the transport stream to the caption module 23050. The MPEG-2TS system decoder 23040 may send the decoded audio and video signal to the audio/video decoder 23120.

The caption module 23050 may receive the caption stream. The caption module 23050 may monitor service #6 or other services and determine whether service #6 or services for transmitting the trigger is selected and sent to the trigger module 23060 or whether caption text is processed and displayed on a screen. Trigger data may be delivered to the trigger module 23060. Other caption services may be subjected to caption text processing and sent to the graphic processor 23150.

The trigger module 23060 may parse trigger, TPT and/or AMT information and process the parsed data. The trigger module 23060 may access the network via the network protocol stack 23080 using the URI information value of the trigger. The URI information value may be the address of the HTTP server. The trigger module 23060 may analyze the TPT file content to obtain the TDO URL. In addition, the trigger module 23060 may parse the AMT to process data. Other information may be obtained through parsing. After the AMT message has been received, the TDO URL corresponding to the web browser is delivered according to a predetermined time and operation or the currently operating TDO may be stopped at a predetermined time. This corresponds to a TDO action and the trigger module 23060 may send a command to the web browser to operate. The operation of the trigger module 23060 related to the present invention will be described in detail below.

The web browser 23070 may receive the command from the trigger module 23060, a browser key code from the UI module 23100 and a browser key code from the remote controller receiver 23160 and communicate with the network protocol stack 23080.

The network protocol stack 23080 may communicate with the trigger module 23060 and the web browser to access the server via the network interface 23090.

The network interface 23090 performs common connection of several other apparatuses or connection of a network computer and an external network. The network interface may be connected to the server to download a TDO, a TPT, an AMT, etc. Here, operation of the network interface 23090 may be operation of the network interface 23090 one generally used in the technical field. Operation of the network interface 23090 related to the present invention will be described in detail below.

The UI module 23100 may receive information input by a viewer using the remote controller 23170 through the remote controller receiver 23160. If the received information is related to a service using the network, the browser key code may be delivered to the web browser. If the received information is related to currently displayed video, the signal may be delivered to the display module 23140 via the graphic processor 23150.

The audio decoder 23110 may decode the audio signal received from the MPEG-2TS System Decoder 23040. Thereafter, the decoded audio signal may be sent to the speaker and output to the viewer. Here, the audio decoder 23110 may be one generally used in the technical field.

The video decoder 23120 may decode the video signal received from the MPEG-2TS system decoder 23040. Thereafter, the decoded video signal may be sent to the display module 23140 to be output to the viewer. Here, the video decoder 23120 may be one generally used in the technical field.

The speakers 23130 may output the audio signal to the viewer. The speaker may be one generally used in the technical field.

The display module 23140 may output the video signal to the viewer. The display module 23140 may be one generally used in the technical field. Operation of the display module 23140 related to the present invention will be described in detail below.

The graphic processor 23150 may perform graphic processing with respect to the caption text received from the caption module 23050 and the viewer input information received from the UI module 23100. The processed information may be delivered to the display module 23140. The graphic processor 23150 may be one generally used in the technical field.

The remote controller receiver 23160 may receive information from the remote controller 23170. At this time, the key code may be delivered to the UI module 23100 and the browser key code may be delivered to the web browser.

The remote controller 23170 delivers the signal input by the viewer to the remote controller receiver 23160. The remote controller 23170 may receive viewer input for changing a virtual channel. In addition, the remote controller may receive information selected by the viewer with respect to the application. The remote controller 23170 may deliver the received information to the remote controller receiver 23160. At this time, the information may be remotely delivered using infrared (IR) light at a distance out of a predetermined range.

Figure 24:
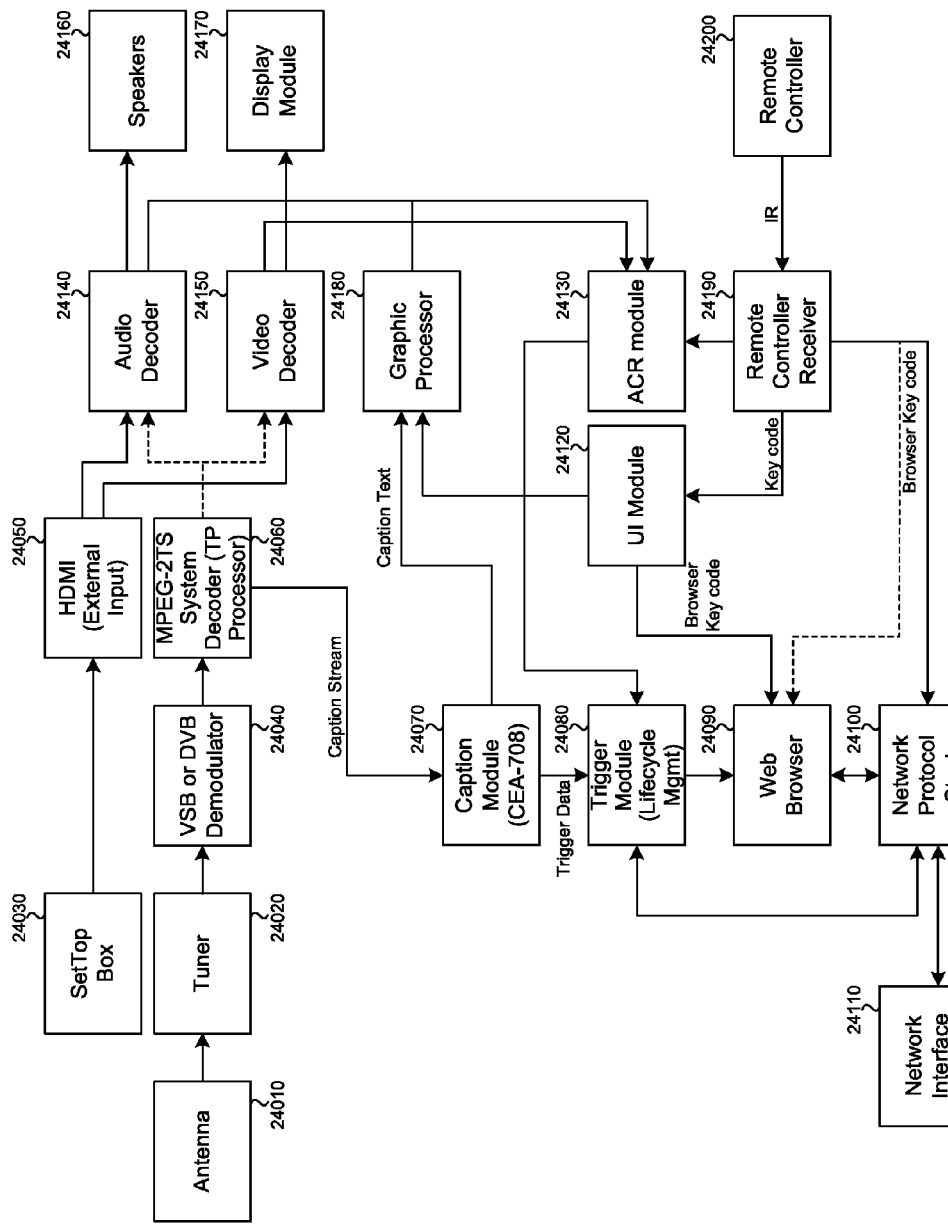
FIG. 24 is a diagram showing the structure of a receiver according to an embodiment of the present invention in the case in which a set top box receives a broadcast via a high definition multimedia interface (HDMI) or an external interface.

FIG. 24 is a diagram showing the structure of a receiver according to an embodiment of the present invention in the case in which a set top box receives a broadcast via a high definition multimedia interface (HDMI) or an external interface.

In the embodiment of the present invention shown in FIG. 24, the receiver may include an antenna 24010, a tuner 24020, a Set-Top Box 24030, a VSB or DVB demodulator 24040, a HDMI 24050, a MPEG-2 TS system decoder 24060), a caption module 24070, a trigger module 24080, a web browser 24090, a network protocol stack 24100, a network interface 24110, a UI module 24120, an ACR module 24130, an audio decoder 24140, a video decoder 24150, a speaker 24160, a display module 24170, a graphic processor 24180, a remote controller receiver 24190, and a remote controller 24200.

In this case, since video and audio of a broadcast stream is raw data, a trigger included in a caption stream may not be received. Details of the present invention will be described below.

Here, the modules excluding the Set-Top Box 24030, the HDMI 24050 and the ACR module 24130 are similar to the modules described in the embodiment of FIG. 23 in terms of the role.

The Set-Top Box 24030, the HDMI 24050 and the ACR module 24130 will now be described.

The Set-Top Box 24030 may restore a compressed signal received from the video server through a digital network to an original video and audio signal. The TV may be an Internet user interface.

The HDMI 24050 may be a high-definition multimedia interface which is a non-compression digital video/audio interface standard. The HDMI 24050 may provide an interface between the Set-Top Box 24030 and an AV apparatus, that is, the audio decoder 24140 and the video decoder 24150.

The ACR module 24130 may automatically recognize broadcast content from the audio decoder 24140 and the video decoder 24150. Based on the currently recognized content, a query may be sent to the ACR server via the trigger module 24080 and the network interface 24110 to receive the TPT/AMT for the trigger.

Figure 25:
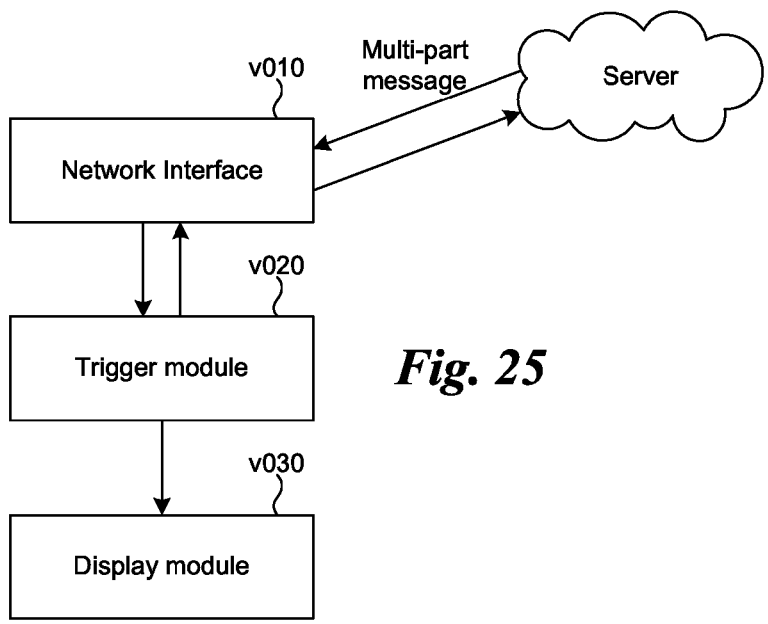
FIG. 25 is a diagram showing an embodiment of a reception apparatus in a TDO model.

FIG. 25 is a diagram showing an embodiment of a reception apparatus in a TDO model.

In the embodiment of the present invention shown in FIG. 25, the receiver may include a network interface v010, a trigger module v020 and a display module v030.

The network interface v010 may perform operation similar to that of the above-described network Interface. The network Interface v010 may receive a multi-part message through HTTP. Here, the multi-part message can consist of an application parameter table as the first part of the multi-part message and an activation message file as the second part of the multi-part message.

The multi-part message, application parameter table and activation message file may be equal to those described above.

The trigger module v020 may perform operation similar to that of the above-described trigger module. The trigger module v020 can parse the multi-part message and obtain the application parameter table and the activation message file. And, the trigger module v020 can parse the application parameter table which includes information about at least one of applications and obtain a first identifier, a second identifier and URL information. And, the trigger module v020 can parse the activation message file that indicates at least one of activation times of the applications and obtain a third identifier and activation messages. And, the trigger module v020 can parse the activation message and obtain a fourth identifier and start time information.

Here, the first identifier can identify an interactive programming segment which the application parameter table pertains to. Here, the second identifier can identify the application within the scope of the application parameter table. Here, the URL information can indicate the URL of a server that can deliver the application. Here, the URL information can identify a file which is part of the application. Here, the network interface can download the application using the URL information. Here, the activation time can mean a time of activation. Here, the third identifier can match the first identifier of the application parameter table which can contain the applications to which the activation messages in the activation message file apply. Here, the fourth identifier can match the second identifier of the application in the application parameter table with which the activation message file is associated. Here, the start time information can indicate the start of time period for an event targeted to the application, relative to time of the segment.

URL information can indicate the URL of a server that can deliver the application. URL information may correspond to a URL element in the TDO element which is the child element of the TPT in FIG. 5. The URL information can identify a file which is part of the application. The network interface can download the application using the URL information.

The meanings and operation of the multi-part message, the application parameter table, the activation message file, the first identifier, the second identifier, the third identifier, the activation message, the fourth identifier and the start time information may be equal to those described above with respect to the transmitter.

In the embodiment of the present invention, the application parameter table may further include a fifth identifier. In this embodiment, the activation message may further include a sixth identifier. The meanings and operation of the fifth identifier and the sixth identifier may be equal to those described above with respect to the transmitter.

In the embodiment of the present invention, if the activation message file is received later than a time specified by the start time information, activation may be immediately performed.

In the embodiment of the present invention, the application parameter table may further include version information. The meanings and operation of the version information may be equal to those described above with respect to the transmitter.

In the embodiment of the present invention, the application parameter table may further include a seventh identifier. In this embodiment, the activation message may further include an eighth identifier. The meanings and operation of the seventh identifier and the eighth identifier may be equal to those described above with respect to the transmitter.

In the embodiment of the present invention, the activation message may include end time information. The meanings and operation of the end time information may be equal to those described above with respect to the transmitter.

In the embodiment of the present invention, the application may be a Triggered Declarative Object (TDO) and the application parameter table may be a TDO parameter table. The TDO and TPT are equal to the above-described TDO and TPT.

In the embodiment of the present invention, the time of the segment may be the media time of the segment. Here, the media time of the segment can be a parameter referencing a point in a playout of a content item.

The display module v030 may perform operation similar to that of the above-described display module. The display module v030 can display the application.

Hereinafter, Direct Execution model will be described.

In the Direct Execution model, a Declarative Object (DO) can be launched automatically as soon as the virtual channel is selected. It can communicate over the Internet with a backend server to get detailed instructions for providing interactive features—creating displays in specific locations on the screen, conducting polls, launching other specialized DOs, etc., all synchronized with the audio-video program.

Hereinafter, the trigger operation in the direct execution model will be described.

The role, function and syntax of the trigger are not largely changed in the direct execution model.

Performance of the trigger is equal to that described above.

Trigger syntax is equal to that described above.

A Trigger can be considered to consist of three parts.
<domain name part>/<directory path>[?<parameters>]

In the direct execution model, the combination of <domain name part> and <directory path> can uniquely identify the DO to be launched.

<parameters> may consist of one or more of "event_time", "media_time", or "spread"

In the direct execution model, an application is launched automatically as soon as the virtual channel is selected. Application can communicate over the Internet with a backend server via a "Synchronized Content Protocol". The server can give detailed instructions for providing interactive feature, which is all synchronized with the audio-video program.

In case of the direct execution model, since an application is immediately executed, information may be delivered to the currently executed application as a time base trigger is delivered. In this model, the application needs to continuously deliver information about currently broadcast content to the server for synchronization. To this end, the time base trigger may further include special information different from that of the TDO model. This special information may be an identifier of currently broadcast content.

Similarly, the content identifier may be present in the parameter part of the trigger in the form of a parameter.

Similarly, the content identifier may be present in media_time of the trigger in the form of one term. The content identifier term, which can be called content_id, which can be designated by "c=" followed by a character string, can represent an identifier for the content currently being viewed.

The content_id term can be intended to support the Direct Execution model of interactive service implementation.

As described above, in this model, Time base triggers with content_id term can be passed in to the application after it is launched, and the application can deliver the content_id to the backend server in order to identify the context for the interaction. Detailed operation thereof will be described below.

The delivery mechanism of the trigger in the direct execution module is equal to that described above.

However, in case of Delivery of Triggers in the Broadcast Stream, Triggers can be delivered in the DTV Closed Caption channel, in Service #6, in the URLString command. And for interactive services using the Direct Execution model, the URI_type field can be set to 2 (Interactive TV Trigger for Direct Execution model).

Hereinafter, overall operation of the direct execution module will be described.

As one model for executing interactive service, in the direct execution model, an application can be launched automatically as soon as the virtual channel is selected. The application can communicate over the Internet with a backend server via a "Synchronized Content Protocol." The server can give detailed instructions for providing interactive features—creating displays in specific locations on the screen, conducting polls, launching other specialized DOs, etc., all synchronized with the audio-video program.

Operation may be performed as follows.

First of all, an application can be launched. Then, a time base trigger is received. The time base trigger is delivered to the application after the application has been executed. The content_id term of the time base trigger may include content identification information of currently displayed content. The application can deliver the content_id to the backend server in order to identify the context for the interaction, and in order to identify the content currently being viewed.

Figure 26:
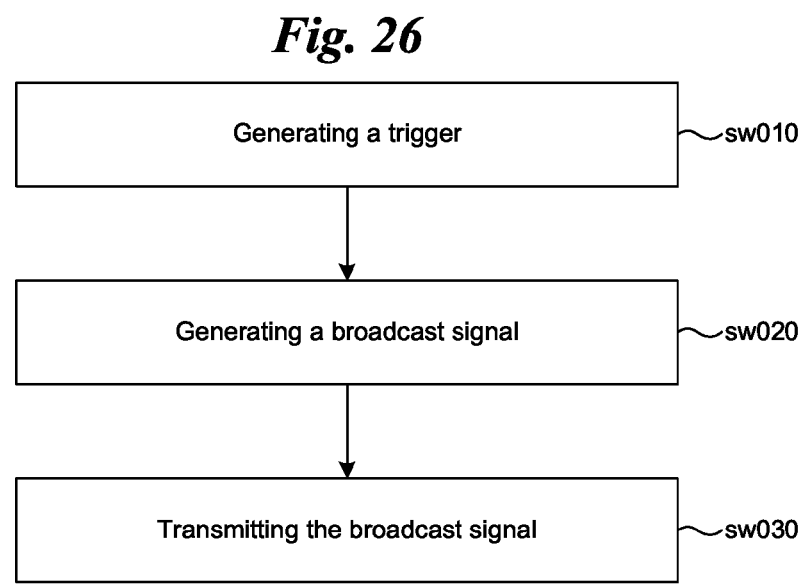
FIG. 26 is a diagram showing an embodiment of a transmission method in a direct execution model.

FIG. 26 is a diagram showing an embodiment of a transmission method in a direct execution model.

The transmission method in the direct execution model according to the embodiment of the present invention may include generating a trigger (sw010), generating a broadcast signal (sw020), and transmitting the broadcast signal (sw030).

In step of generating a trigger (sw010), a trigger to be transmitted is generated. Here, the trigger can contain a first identifier and a parameter. Here, the first identifier can identify an application to be launched. Here, the parameter can contain a media time stamp and a content identifier. Here, the media time stamp can indicate a current point in the playout of content. Here, the content identifier can identify the content currently being viewed. Here, the trigger can be passed into the application after the application is launched. Here, the application can deliver the content identifier to a server in order to identify the content currently being viewed.

Here, the first identifier may correspond to locator_part in the above-described trigger syntax. locator_part may include <domain name part> and <directory path> part. The combination of <domain name part> and <directory path> can uniquely identify the application to be launched.

A parameter may correspond to a <parameter> part of the above-described trigger syntax. <parameters> may consist of one or more of "event_time", "media_time", or "spread".

The media time stamp may correspond to the above-described "media_time" of <parameters>.

The content identifier may correspond to content_id term in the above-described "media_time" of <parameters>.

The server may be the above-described back-end server.

The receiver may receive and parse the trigger to obtain the first identifier, the parameter, the media time stamp, and the content identifier information. Using the first identifier information, the application to be executed may be identified. The received trigger may be delivered to the application which is being executed. The application may deliver the content identifier information in the media time stamp of the parameter to the server such that the server identifies information about currently displayed content. After that, the server can give detailed instructions for providing interactive features.

In step of generating a trigger (sw010), the embodiment of the present invention is implemented as follows. The first identifier can consist of a first part and a second part. Here, the first part may be the above-described <domain name part>. Here, the second part may be the above-described <directory path>. As described above with respect to <domain name part> and <directory path>, the first part can reference a registered Internet domain name and the second part can identify a directory path under control and management of an entity who owns rights to identified domain name.

In step of generating a trigger (sw010), in the embodiment of the present invention, the trigger can have maximum length of 52 bytes.

In step of generating a trigger (sw010), the embodiment of the present invention is implemented as follows. The application is to be downloaded if the application is not pre-installed or already cached, and wherein the application is identified by the first identifier. The receiver may download an application if the application identified by the first identifier is not present.

In step of generating a trigger (sw010), in the embodiment of the present invention, "the current point in the playout of the content" may mean the media time of a segment.

In step of generating a trigger (sw010), in the embodiment of the present invention, the application may be one of a Declarative Object, a Triggered Declarative Object, a Non-Real Time Declarative Object, and an Unbound Declarative Object.

In step of generating a broadcast signal (sw020), the broadcast signal including the generated trigger may be generated. The process of generating the broadcast signal may be generally used in the technical field.

In step of generating a broadcast signal (sw020), in the embodiment of the present invention, the trigger may be inserted into the DTV closed caption channel of the broadcast signal in the process of generating the broadcast signal.

In step of transmitting the broadcast signal (sw030), the generated broadcast signal may be transmitted.

The structure of the receiver shown in FIGS. 23 and 24 may apply to the direct execution model.

Figure 27:
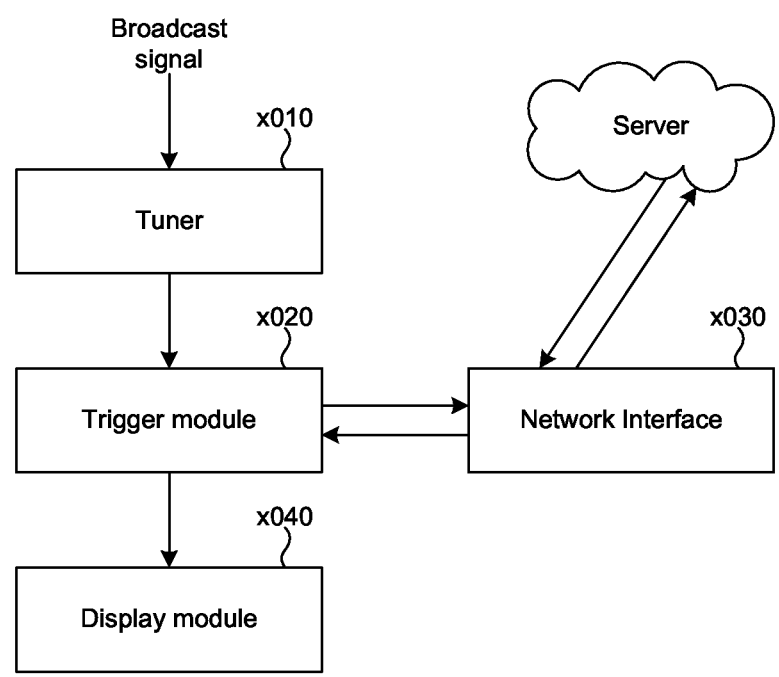
FIG. 27 is a diagram showing an embodiment of a reception apparatus in a direct execution model.

FIG. 27 is a diagram showing an embodiment of a reception apparatus in a direct execution model.

The reception apparatus in the direct execution model according to the embodiment of the present invention may include a tuner x010, a trigger module x020, a network interface x030 and a display module x040.

The tuner x010 may perform operation similar to that of the tuner shown in FIG. 23. The tuner x010 may receive a broadcast signal including a trigger containing content_id information. Here, content_id may be the identifier of the above-described currently broadcast content.

The trigger module x020 may perform operation similar to that of the trigger module shown in FIG. 23. The trigger module x020 can parse the broadcast signal and obtain the trigger. And, the trigger module x020 can parse the trigger and obtain a first identifier and a parameter. The trigger module x020 can launch the application identified by the first identifier. And, the trigger module x020 can parse the parameter, and obtain a media time stamp and a content identifier.

Here, the first identifier can identify an application to be launched. Here, the trigger can be passed into the application after the application is launched. Here, the media time stamp can indicate a current point in the playout of content. Here, the content identifier can identify the content currently being viewed.

The meanings and operations of the trigger, the first identifier, the parameter, the media time stamp and the content identifier may be equal to those described in the process of transmitting the broadcast signal in the direct execution model.

The embodiment of the present invention may be implemented as follows. The first identifier can consist of a first part and a second part. Here, the first part may be the above-described <domain name part>. Here, the second part may be the above-described <directory path>. As described above with respect to <domain name part> and <directory path>, the first part can reference a registered internet domain name and the second part can identify a directory path under control and management of an entity who owns rights to identified domain name.

In the embodiment of the present invention, the trigger can have maximum length of 52 bytes.

In the embodiment of the present invention, "the current point in the playout of the content" may mean the media time of a segment.

In the embodiment of the present invention, the application may be one of a Declarative Object, a Triggered Declarative Object, a Non-Real Time Declarative Object and an Unbound Declarative Object.

In the embodiment of the present invention, the trigger may be inserted into the DTV closed caption channel in the broadcast signal.

The network interface x030 can communicate with a server. Here, the application can deliver the content identifier to the server using the network interface in order to identify the content currently being viewed.

The embodiment of the present invention may be implemented. The application is to be downloaded if the application is not pre-installed or already cached, and the application is identified by the first identifier. The receiver may download the network interface x020 if an application identified by the first identifier is not present.

The display module x040 can display the application.

According to the present invention, it is possible to provide supplementary information related to broadcast content using the existing broadcast system.

Various embodiments have been described in the best mode for carrying out the invention.

The present invention is available in a series of broadcast service provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing an enhancement service for a broadcast service, the method comprising:
   generating service data for the broadcast service;
   generating an application table which includes a plurality of application elements having application identifiers and information about applications related to a plurality of events, wherein each of the application elements includes a plurality of event elements having event identifiers and information about the events, wherein each of the event elements include a plurality of data elements having data identifiers;
   generating an event table including a set of notifications initiating actions to be taken by the applications, the event table including a plurality of event messages and a period identifier identifying an interval of the broadcast service, wherein each of the event messages includes an event attribute matching an event identifier for one of the events related to an application, an app attribute matching an application identifier for the application, a data attribute matching a data identifier for data to be used for activation of the one of the events and time information indicating presentation time of the one of the events relative to media time of the broadcast service;
   transmitting the service data of the broadcast service via first channel;
   transmitting the application table and the event table for the enhancement service via second channel;
   generating an event unit having a term identifying the one of the events by referencing one of the application identifiers and the event identifiers; and
   transmitting the event unit via the second channel, wherein the term further includes a data identifying value which is referencing data to be used for activation of the one of the events.

2. The method of claim 1,
   wherein the event unit further includes an additional term indicating a new timing of the one of the events.

3. An apparatus for providing an enhancement service for a broadcast service, the apparatus comprising:
   a tuner that receives service data of the broadcast service via first channel;
   a network interface that receives an application table and an event table for the enhancement service via second channel;
   a trigger module that obtains the application table and the event table, wherein the application table includes a plurality of application elements having application identifiers and information about applications related to a plurality of events, wherein each of the application elements includes a plurality of event elements having event identifiers and information about the events, wherein each of the event elements include a plurality of data elements having data identifiers,
   wherein the event table provides a set of notifications initiating actions to be taken by the applications, the event table including a plurality of event messages and a period identifier identifying an interval of the broadcast service, wherein each of the event messages includes an event attribute matching an event identifier for one of the events related to an application, an app attribute matching an application identifier for the application, a data attribute matching a data identifier for data to be used for activation of the one of the events and time information indicating presentation time of the one of the events relative to media time of the broadcast service; and
   a display module that displays the one of the events,
   wherein the receiving unit receives an event unit having a term identifying the one of the events by referencing one of the application identifiers and the event identifiers, and
   wherein the term further includes a data identifying value which is referencing data to be used for activation of the one of the events.

4. The apparatus of claim 3,
   wherein the event unit further includes an additional term indicating a new timing of the one of the events.

* * * * *